United States Patent
Padmanabhan et al.

(10) Patent No.: US 9,224,163 B2
(45) Date of Patent: *Dec. 29, 2015

(54) INCREMENTAL COMPUTATION OF BILLING PERCENTILE VALUES IN A CLOUD BASED APPLICATION ACCELERATION AS A SERVICE ENVIRONMENT

(71) Applicants: Vivek Padmanabhan, Karnataka (IN); Subrat Mishra, Karnataka (IN); Shyamtanu Majumder, Karnataka (IN); Ashwath Nagaraj, Los Altos Hills, CA (US)

(72) Inventors: Vivek Padmanabhan, Karnataka (IN); Subrat Mishra, Karnataka (IN); Shyamtanu Majumder, Karnataka (IN); Ashwath Nagaraj, Los Altos Hills, CA (US)

(73) Assignee: ARYAKA NETWORKS, INC., Newark, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/726,651

(22) Filed: Jun. 1, 2015

(65) Prior Publication Data

US 2015/0262268 A1    Sep. 17, 2015

Related U.S. Application Data

(63) Continuation-in-part of application No. 14/529,132, filed on Oct. 30, 2014, which is a continuation-in-part of application No. 12/550,409, filed on Aug. 31, 2009, now Pat. No. 8,489,685.

(51) Int. Cl.
| | |
|---|---|
| G06F 15/16 | (2006.01) |
| G06Q 30/04 | (2012.01) |
| H04L 29/08 | (2006.01) |
| H04L 12/14 | (2006.01) |

(52) U.S. Cl.
CPC ............ *G06Q 30/04* (2013.01); *H04L 12/1428* (2013.01); *H04L 12/1435* (2013.01); *H04L 67/10* (2013.01)

(58) Field of Classification Search
CPC   G06Q 10/10; H04L 12/4633; H04L 63/0272; H04L 69/04; H04L 63/029; H04L 67/10; H04L 63/0227; H04L 63/0281; H04L 67/327
USPC ........................................................ 709/205
See application file for complete search history.

*Primary Examiner* — Maceeh Anwari
(74) *Attorney, Agent, or Firm* — Raj Abhyanker, P.C.

(57) ABSTRACT

Disclosed is a method of incremental computation of billing percentile values in a cloud based application acceleration as a service environment. In one aspect, a method includes sampling a usage data of a network entity of an application acceleration as a service provider in intervals of five minutes using a processor and a memory. A $95^{th}$ percentile value is automatically calculated based on a next value in the billing cycle after the top 5% of samples in the billing cycle. The $95^{th}$ percentile value of each of a plurality of billable units for each of billing measurements for a large scale data associated with the network entity is incrementally computed by computing the $95^{th}$ percentile value upon a newest set of data arrived to the network entity in each five minute interval. A billing amount is determined based on an incremental computation.

20 Claims, 12 Drawing Sheets

US 9,224,163 B2

INCREMENTAL COMPUTATION OF BILLING PERCENTILE VALUES IN A CLOUD BASED APPLICATION ACCELERATION AS A SERVICE ENVIRONMENT

CLAIM OF PRIORITY

This patent application is a continuation in part, claims priority from, and hereby incorporates by reference and claims priority from the entirety of the disclosures of the following cases and each of the cases on which they depend and further claim priority or incorporate by reference:
(1) U.S. Utility patent application Ser. No. 14/529,132 titled 'APPLICATION ACCELERATION AS A SERVICE SYSTEM AND METHOD' filed on Oct. 30, 2014, which is a CIP of U.S. application Ser. No. 12/550,409 filed on Aug. 31, 2009 and now issued as U.S. Pat. No. 8,489,685 on Jul. 16, 2013.

FIELD OF TECHNOLOGY

This disclosure relates generally to a technical field of computer networking and, in one example embodiment, to a method of an incremental computation of billing percentile values in a cloud based application acceleration as a service environment.

BACKGROUND

Application acceleration may increasingly be offered as a service. As a result, an organization may not need to purchase, deploy, and/or maintain expensive infrastructure (e.g., compression appliances, decompression equipment, etc.) at each head office and at each branch office to accelerate private applications and secure data. For example, the organization may not need to purchase expensive and proprietary hardware and/or software solutions that perform functions such as load balancing, compression, de-compression, and/or packet routing. In addition, the organization may not need purchase expensive Multiprotocol Label Switching (MPLS) services from bandwidth providers.

However, a provider of application acceleration as a service may encounter great challenges in billing customers having multiple geographically distributed entities. The number of these entities may be in the tens of thousands. In such environments, complexities of billing might involve billing customers across different aspects of the acceleration service (e.g., time zone, geography, bandwidth usage) and across different criteria (e.g., volume, traffic). Massive computing power may be required to determine billing in such instances, and significant resources may need to be expended in facilitating the billing process of application acceleration as a service. Therefore, efficiency may be reduced and complexity in billing processes may constrain the growth of the provider of application acceleration services.

SUMMARY

Disclosed is a method of incremental computation of billing percentile values in a cloud based application acceleration as a service environment.

In one aspect, a method includes sampling a usage data of a network entity of an application acceleration as a service provider in intervals of five minutes using a processor and a memory. Each five minute interval is constituted a billing unit. Each billing unit of a customer is sorted based on bandwidth usage to determine a top five percent (5%) of samples in a period of a billing cycle. The top 5% of samples is designated in the period of the billing cycle as a burst bandwidth data.

A $95^{th}$ percentile value is automatically calculated based on a next value in the billing cycle after the top 5% of samples in the billing cycle. The $95^{th}$ percentile value of each of a plurality of billable units for each of billing measurements for a large scale data associated with the network entity is incrementally computed by computing the $95^{th}$ percentile value upon a newest set of data arrived to the network entity in each five minute interval.

The method determines a billing amount based on an incremental computation of the $95^{th}$ percentile value of each of the plurality of billable units for each of billing measurements for the large scale data associated with the network entity by a computation applied only upon the newest set of data arrived to the network entity in each five minute interval. The computation does not require traversing through all the data for the billing cycle associated with each of a plurality of billable units.

The incremental computation may be included processing only the newest set of data arrived at every run of the method. The newest set of data may be a data that arrived from an Internet network between a current run and a previous run of a process. The method may further include executing a sequence of processes to run a compute of all billing details across each of the plurality of billable units. The sequence of processes may be persisted into a storage system.

Any request to view $95^{th}$ percentile value from the storage system may be served in real time whenever it is requested by the customer on an ad hoc basis. A billing statement may be generated in real time whenever it is requested by the customer on the ad hoc basis through an incremental computation method.

The method may further include collecting a statistical data for all the network entities served. A calculated amount may be reconciled across each of the plurality of billable units with an agreement with the customer at a commencement of an engagement with the service provider. A process algorithm may be applied to communicate the data into a distributed file system. A Hadoop framework may be utilized to provide fault tolerance to the data and/or provide parallel computation of a billing network across all entities.

The method may include defining a sequence of operations from all service models offered through the application acceleration as the service. A sequence may be included a Directed Acyclic Graph of map reduce applications. A map reduce functions may be chained into a SQL-like declarative data flow language. The SQL-like declarative data flow language may be Apache Pig.

A persistence model may be utilized including bounded min max priority queue to attain the fault tolerance and/or replication. A queue for each and/or every entity may be indexed. The queue for each network entity may be reset. A second level process may be evoked to define a sequence of a map-reduce job that further processes the data. The incremental computation may provide a very efficient and/or scalable method to automate a billing computation associated with the customer. The storage system may store results of incremental computations a-priori at short and/or defined intervals.

On every interval execution, a second level process may analyze an input samples stored in a distributed file system. A one minute data may be aggregated and written by network nodes to 5 min data per each network entity. An indexed persistence model may be searched to fetch a min max priority queue for that entity and/or ingest bandwidth information from a network file data into a min max queue while preserving a structure of the min max priority queue.

The second level process may initialize a bounded min max priority queue for each of the entities to zero at a first cycle of a billing period. The min max priority queue may be bounded with size equivalent to a 5% of a set of possible samples in the billing period plus one. A new set of values may be added to the bounded min max priority queue. Any new value may be rejected from the bounded min max priority queue if the new value is lesser than a smallest value in the bounded min max priority queue while the bounded min max priority queue is full.

The smallest value may be evicted from the bounded min max priority queue if the new value is larger than the smallest value in the bounded min max priority queue while the bounded min max priority queue is full. A min value of the bounded min max priority queue may be extracted as the $95^{th}$ percentile value of the billing period. A max value of the bounded min max priority queue may be extracted as a peak value of the billing period.

The usage data may be sampled across each geographic location and/or each network entity associated with the customer of the application acceleration as the service provider. The usage data may be a calculation of bytes of data transferred from the network entity, bytes of data received by the network entity, a bits-per-second traffic rate sent from the network entity to a wide area network (WAN) and/or a bits per second traffic rate received to the network entity from a WAN. The network entity may be a point of presence (POP) node in the WAN, an aggregate network utilization estimation of the customer taken as a whole and/or a logical network module deployed for the customer across in furtherance of the application acceleration as a service.

In another aspect, a method includes sampling a usage data of a network entity of an application acceleration as a service provider in intervals of five minutes. Each five minute interval constitutes a billing unit. Each billing unit of a customer is sorted based on bandwidth usage to determine a top $n^{th}$ percent of samples in a period of a billing cycle. A top $n^{th}$ of samples are designated in the period of the billing cycle as a burst bandwidth data. A $1$-$n^{th}$ percentile value is automatically calculated based on a next value in the billing cycle after a top $n^{th}$ percentile of samples in the billing cycle using a processor and a memory.

The $1$-$n^{th}$ percentile of each of a plurality of billable units for each of billing measurements for a large scale data is incrementally computed associated with the network entity by computing the $1$-$n^{th}$ percentile upon a newest set of data arrived to the network entity in each five minute interval using the processor and the memory.

A billing amount is determined based on an incremental computation of the $1$-$n^{th}$ percentile of each of the plurality of billable units for each of billing measurements for the large scale data associated with the network entity by a computation applied only upon the newest set of data arrived to the network entity in each five minute interval. The computation does not require traversing through all the data for the billing cycle associated with each of a plurality billable unit. The incremental computation includes processing only the newest set of data arrived at every run of the method. The newest set of data is a data that arrived from an Internet network between a current run and a previous run of a process.

The method further includes executing a sequence of processes to run a compute of all billing details across each of the plurality of billable units. The sequence of processes is persisted into a storage system. Any request is served to view $1$-$n^{th}$ percentile data from the storage system in real time whenever it is requested by the customer on an ad hoc basis. A billing statement is generated in real time whenever it is requested by the customer on the ad hoc basis through an incremental computation method.

In yet another aspect, a method includes sampling a usage data of a network entity of an application acceleration as a service provider in intervals of five minutes using a processor and a memory. Each five minute interval constitutes a billing unit. Each billing unit of a customer is sorted based on bandwidth usage to determine a top $n^{th}$ of samples in a period of a billing cycle. The top $n^{th}$ of samples is designated in the period of the billing cycle as a burst bandwidth data.

A $1$-$n^{th}$ percentile value is automatically calculated based on a next value in the billing cycle after a top $n^{th}$ of samples in the billing cycle. The $1$-$n^{th}$ percentile of each of a plurality of billable units for each of billing measurements for a large scale data associated with the network entity is incrementally computed by computing the $1$-$n^{th}$ percentile upon a newest set of data arrived to the network entity in each five minute interval.

A billing amount is determined based on an incremental computation of the $1$-$n^{th}$ percentile of each of the plurality of billable units for each of billing measurements for the large scale data associated with the network entity by a computation applied only upon the newest set of data arrived to the network entity in each five minute interval.

The computation does not require traversing through the usage data for the billing cycle associated with each of a plurality billable units. A process algorithm is applied to communicate the usage data into a distributed file system. A Hadoop framework is utilized to provide fault tolerance to the usage data and/or to provide parallel computation of a billing network across all entities.

The method, apparatus, and system disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
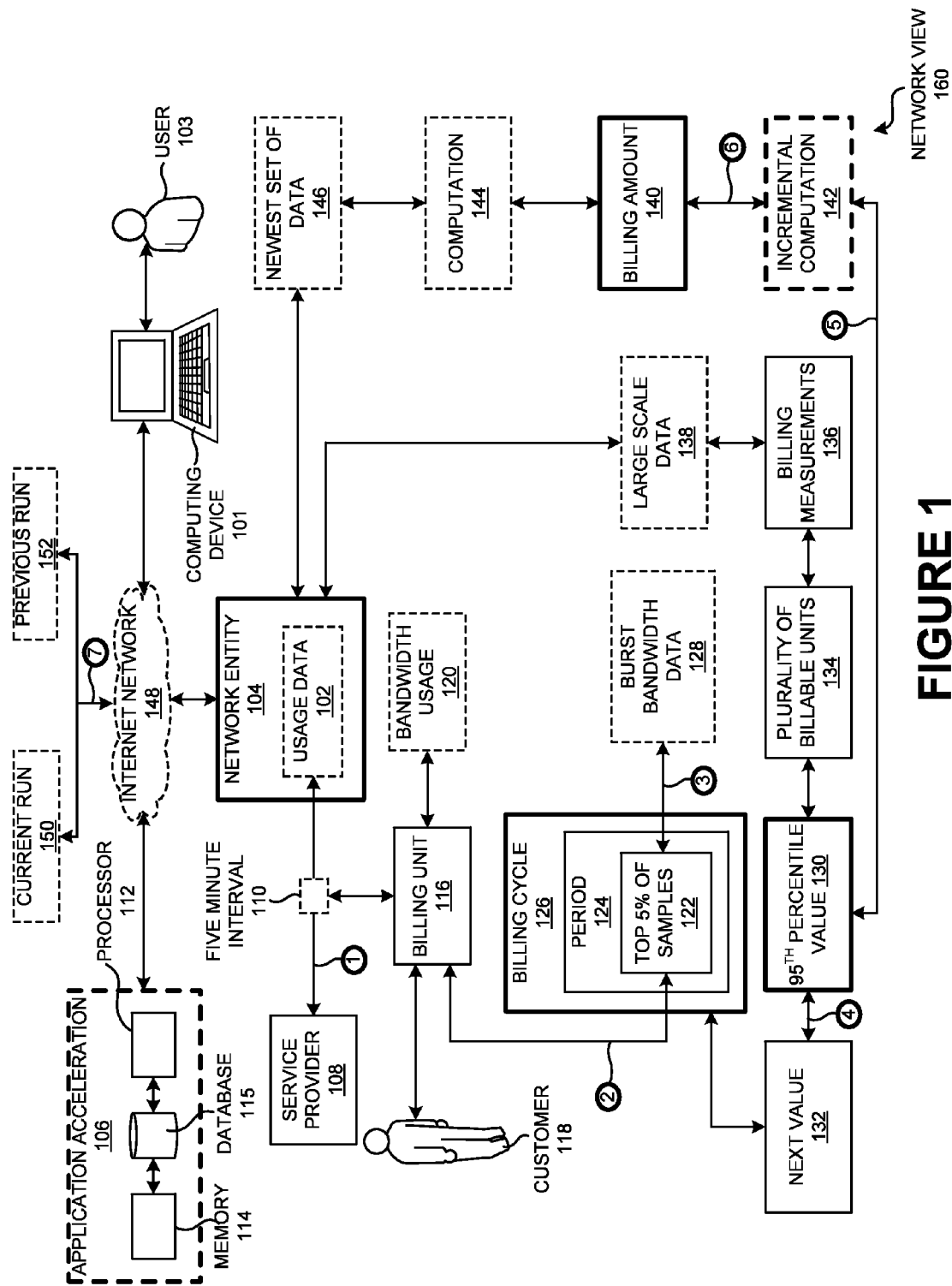
FIG. 1 is a network view of an incremental computation of billing percentile values in a cloud based application acceleration environment, according to one embodiment.

Other features of the present embodiments will be apparent from the accompanying drawings and from the detailed description that follows.

DETAILED DESCRIPTION

Example embodiments, as described below, may be used to provide a method of an incremental computation of billing percentile values in a cloud based application acceleration as a service environment. Although, the present embodiments have been described with reference to specific example embodiments, it will be evident that various modifications and changes may be made to these embodiments without departing from the broader spirit and scope of the various embodiments.

In one embodiment, a method includes sampling a usage data 102 of a network entity 104 of an application acceleration 106 as a service provider 108 in intervals of five minutes using a processor 112 and a memory 114. Each five minute interval 110 is constituted a billing unit 116. Each billing unit 116 of a customer 118 is sorted based on bandwidth usage 120 to determine a top five percent (5%) of samples 122 in a period 124 of a billing cycle 126. The top 5% of samples 122 is designated in the period 124 of the billing cycle 126 as a burst bandwidth data 128.

A $95^{th}$ percentile value 130 is automatically calculated based on a next value 132 in the billing cycle 126 after the top 5% of samples 122 in the billing cycle 126. The $95^{th}$ percentile value 130 of each of a plurality of billable units 134 for each of billing measurements 136 for a large scale data 138 associated with the network entity 104 is incrementally computed by computing the 95th percentile value 130 upon a newest set of data 146 arrived to the network entity 104 in each five minute interval 110.

The method determines a billing amount 140 based on an incremental computation 142 of the $95^{th}$ percentile value 130 of each of the plurality of billable units 134 for each of billing measurements for the large scale data 138 associated with the network entity 104 by a computation 144 applied only upon the newest set of data 146 arrived to the network entity 104 in each five minute interval 110. The computation 144 does not require traversing through all the data for the billing cycle 126 associated with each of a plurality billable units.

The incremental computation 142 may be included processing only the newest set of data 146 arrived at every run of the method. The newest set of data 146 may be a data that arrived from an Internet network 148 between a current run 150 and a previous run 152 of a process. The method may further include executing a sequence of processes 302 to run a compute of all billing details 304 across each of the plurality of billable units 134. The sequence of processes 302 may be persisted into a storage system 306.

Any request to view $95^{th}$ percentile value 130 from the storage system 306 may be served in real time whenever it is requested by the customer 118 on an ad hoc basis. A billing statement 308 may be generated in real time whenever it is requested by the customer 118 on the ad hoc basis through an incremental computation method (e.g., the incremental computation 142).

The method may further include collecting a statistical data 310 for all the network entities served. A calculated amount may be reconciled across each of the plurality of billable units 134 with an agreement with the customer 118 at a commencement of an engagement with the service provider 108. A process algorithm 312 may be applied to communicate the data into a distributed file system 314. A Hadoop framework 316 may be utilized to provide fault tolerance 318 to the data and/or provide parallel computation of a billing network across all entities.

The method may include defining a sequence of operations from all service models offered through the application acceleration 106 as the service. A sequence may be included a Directed Acyclic Graph of map reduce applications. A map reduce functions may be chained into a SQL-like declarative data flow language. The SQL-like declarative data flow language may be Apache Pig.

A persistence model 320 may be utilized (e.g., using utilization function 330) including bounded min max priority queue 322 to attain the fault tolerance 318 and/or replication 324. A queue for each and/or every entity may be indexed (e.g., using indexing function 332). The queue for each network entity 104 may be reset (e.g., using resetting function 334). A second level process 326 may be evoked to define a sequence of a map-reduce job 328 that further processes the data. The incremental computation 142 may provide a very efficient and/or scalable method to automate a billing computation associated with the customer 118. The storage system 306 may store results of incremental computation(s) 142 a-priori at short and/or defined intervals.

On every interval execution, a second level process 326 may analyze an input samples stored in a distributed file system 314. A one minute data may be aggregated and written by network nodes to 5 min data per each network entity 104. An indexed persistence model (e.g., using persistence model 320) may be searched to fetch a min max priority queue 322 for that entity and/or ingest bandwidth information from a network file data into a min max queue while preserving a structure of the min max priority queue 322.

The second level process 326 may initialize a bounded min max priority queue 322 for each of the entities to zero at a first cycle of a billing period. The min max priority queue 322 may be bounded with size equivalent to a 5% of a set of possible samples in the billing period plus one. A new set of values may be added to the bounded min max priority queue 322. Any new value may be rejected from the bounded min max priority queue 322 if the new value is lesser than a smallest value in the bounded min max priority queue 322 while the bounded min max priority queue 322 is full.

The smallest value may be evicted from the bounded min max priority queue 322 if the new value is larger than the smallest value in the bounded min max priority queue 322 while the bounded min max priority queue 322 is full. A min value of the bounded min max priority queue 322 may be extracted as the $95^{th}$ percentile value 130 of the billing period. A max value of the bounded min max priority queue 322 may be extracted as a peak value of the billing period.

The usage data 102 may be sampled across each geographic location 202 and/or each network entity 104 associated with the customer 118 of the application acceleration 106 as the service provider 108. The usage data 102 may be a calculation of bytes of data transferred from the network entity 104, bytes of data received by the network entity 104, a bits-per-second traffic rate sent from the network entity 104 to a wide area network (WAN) and/or a bits per second traffic rate received to the network entity 104 from a WAN. The network entity 104 may be a point of presence (POP) node 204 in the WAN, an aggregate network utilization estimation 206 of the customer 118 taken as a whole and/or a logical network module 208 deployed for the customer 118 across in furtherance of the application acceleration 106 as a service.

In another embodiment, a method includes sampling a usage data 102 of a network entity 104 of an application acceleration 106 as a service provider 108 in intervals of five minutes. Each five minute interval 110 constitutes a billing unit 116. Each billing unit 116 of a customer 118 is sorted based on bandwidth usage 120 to determine a top $n^{th}$ percent of samples in a period 124 of a billing cycle 126. A top $n^{th}$ of samples are designated in the period 124 of the billing cycle 126 as a burst bandwidth data 128. A 1-$n^{th}$ percentile value is automatically calculated based on a next value 132 in the billing cycle 126 after a top $n^{th}$ percentile of samples in the billing cycle 126 using a processor 112 and a memory 114.

The 1-$n^{th}$ percentile of each of a plurality of billable units 134 for each of billing measurements 136 for a large scale data 138 is incrementally computed associated with the network entity 104 by computing the 1-$n^{th}$ percentile upon a newest set of data 146 arrived to the network entity 104 in each five minute interval 110 using the processor 112 and the memory 114.

A billing amount 140 is determined based on an incremental computation 142 of the 1-$n^{th}$ percentile of each of the plurality of billable units 134 for each of billing measurements 136 for the large scale data 138 associated with the network entity 104 by a computation 144 applied only upon the newest set of data 146 arrived to the network entity 104 in each five minute interval 110. The computation 144 does not require traversing through all the data for the billing cycle 126 associated with each of a plurality billable units. The incremental computation 142 includes processing only the newest set of data 146 arrived at every run of the method. The newest set of data 146 is a data that arrived from an Internet network 148 between a current run 150 and a previous run 152 of a process.

The method further includes executing a sequence of processes 302 to run a compute of all billing details 304 across each of the plurality of billable units 134. The sequence of processes 302 is persisted into a storage system 306. Any request is served to view 1-$n^{th}$ percentile data from the storage system 306 in real time whenever it is requested by the customer 118 on an ad hoc basis. A billing statement 308 is generated in real time whenever it is requested by the customer 118 on the ad hoc basis through an incremental computation 142.

In yet another embodiment, a method includes sampling a usage data 102 of a network entity 104 of an application acceleration 106 as a service provider 108 in intervals of five minutes using a processor 112 and a memory 114. Each five minute interval 110 constitutes a billing unit 116. Each billing unit 116 of a customer 118 is sorted based on bandwidth usage 120 to determine a top $n^{th}$ of samples in a period 124 of a billing cycle 126. The top $n^{th}$ of samples is designated in the period 124 of the billing cycle 126 as a burst bandwidth data 128.

A 1-$n^{th}$ percentile value is automatically calculated based on a next value 132 in the billing cycle 126 after a top $n^{th}$ of samples in the billing cycle 126. The 1-$n^{th}$ percentile of each of a plurality of billable units 134 for each of billing measurements 136 for a large scale data 138 associated with the network entity 104 is incrementally computed by computing the 1-$n^{th}$ percentile upon a newest set of data 146 arrived to the network entity 104 in each five minute interval 110.

A billing amount 140 is determined based on an incremental computation 142 of the 1-$n^{th}$ percentile of each of the plurality of billable units 134 for each of billing measurements 136 for the large scale data 138 associated with the network entity 104 by a computation 144 applied only upon the newest set of data 146 arrived to the network entity 104 in each five minute interval 110.

The computation 144 does not require traversing through the usage data 102 for the billing cycle 126 associated with each of a plurality of billable units. A process algorithm 312 is applied to communicate the usage data 102 into a distributed file system 314. A Hadoop framework 316 is utilized to provide fault tolerance 318 to the usage data 102 and/or to provide parallel computation of a billing network across all entities.

FIG. 1 is a network view 160 of an incremental computation 142 of billing percentile values in a cloud based application acceleration environment (e.g., using an application acceleration 106), according to one embodiment.

Particularly, FIG. 1 shows a computing device 101, a usage data 102, a user 103, a network entity 104, an application acceleration 106, a service provider 108, a five minute interval 110, a processor 112, a memory 114, a database 115, a billing unit 116, a customer 118, a bandwidth usage 120, a top 5% of samples 122, a period 124, a billing cycle 126, a burst bandwidth data 128, a 95$^{th}$ percentile value 130, a plurality of billable units 134, a billing measurements 136, a billing amount 140, an incremental computation 142, a computation 144, a newest set of data 146, an internet network 148, a current run 150 and a previous run 152, according to one embodiment.

A computing device 101 may be a programmable electronic device designed to accept data, perform prescribed mathematical and/or logical operations automatically at high speed, and display the results of these operations. A usage data 102 may be the amount of data that is sent, received, downloaded, and/or uploaded by the user 103 through the internet network 148. A user 103 may be a person and/or an individual using the application acceleration 106 as a service. A network entity 104 may be defined as a manageable logical object uniting one and/or more physical devices (e.g., computing device(s) 101). The network entity 104 may allow distributed computing device(s) 101 to be managed in a unified way using one management system, according to one embodiment.

In one embodiment, an application acceleration 106 may be used to speed up dynamic and highly interactive Web applications with bolstered security, providing better performance and higher availability to the user 103 of the computing device 101. The application acceleration 106 may ensure consistent performance of Web-based applications across different aspects of the acceleration services (e.g., time zone, geography, bandwidth usage 120) and across different criteria (e.g., volume, traffic). The application acceleration 106 may use a number of technologies to improve application performance and response time over network connections (e.g., the internet network 148.

An application acceleration 106 may improve experience of the user 103 of the computing device 101 to drive greater service adoption. In addition, the application acceleration 106 may improve the efficiency of underlying infrastructure to reduce capital and/or operational costs. By offloading compute-intensive functions from servers, enabling application-aware traffic management and optimizing the flow of traffic over wide area networks (e.g., internet network 148), the application acceleration 106 may extract maximum performance and ROI from investments in application infrastructure, according to one embodiment.

A service provider 108 may be a company, an organization, business, and/or an individual that provides an application acceleration 106 as a service to the customer(s) 118. The service provider 108 may refer to organizational sub-units, it may be used to refer to third party and/or outsourced suppliers, including telecommunications service providers (TSPs), application service providers (ASPs), storage service providers (SSPs), and/or Internet service providers (ISPs). A five minute interval 110 may be a distinct measure of time which may constitute a billing unit 116 in five minutes, according to one embodiment.

A processor 112 may be a central processing unit of the computing device 101 of the user 103 containing the logic circuitry to perform all the basic instructions of the application acceleration 106. A memory 114 may be a device used to store data or programs (e.g., sequences of instructions) on a temporary and/or permanent basis for use in the computing device 101. A database 115 may be a collection of information that is organized so that it can easily be accessed, managed, and/or updated, according to one embodiment.

A billing unit 116 may be an element that can be used to bill the customer 118. The customer(s) 118 may be billed at a resource level and/or a functional level. Each billing unit 116 of a customer 118 may be sorted based on bandwidth usage 120. A customer 118 may be a person, company and/or other entity which buys services (e.g., the application acceleration 106 as a service) produced by another person, company, and/or other entity, according to one embodiment.

In one embodiment, a bandwidth usage 120 may be the amount of data transmitted and/or received by a particular computing device 101 of the user 103. The bandwidth usage 120 may refer to all inbound and/or outbound traffic. The service provider 108 may track the bandwidth usage 120 by looking at the amount of data going through a particular connection by identifying specific computers (e.g., the computing device 101). A top 5% of samples 122 may be entities and/or observations randomly selected to represent the behavior and/or characteristics of a plurality of billable units 134 for a large scale data 138 in the billing cycle 126. A period 124 may be the interval of time required for a cyclic motion and/or phenomenon to complete a billing cycle 126.

A billing cycle 126 may be the interval of time during which bills are prepared for services that a company has sold. The billing cycle 126 may be the period of time between billings and may have a specific number of days with a closing date that ends the billing cycle. The billing cycle 126 may run monthly, weekly, quarterly, and/or on a schedule and may be referred as recurring. A burst bandwidth data 128 may be the ability of customer 118 to use more bandwidth, temporarily, than what is contracted for. The customer 118 may incur overage charges with the service, according to one embodiment.

A $95^{th}$ percentile value 130 may be a way to measure the bandwidth usage 120 based on usage of a customer 118 relative to committed base rate. A $95^{th}$ percentile value 130 may be an alternative to either capped ports with fixed billing and/or actual data transferred, which are models seen outside the datacenter where occasional bursting is either not allowed and/or penalized with higher bills. Basically the $95^{th}$ percentile may say that 95% of the time, the usage is below this amount. Conversely, 5% of the time, usage is above that amount. The $95^{th}$ percentile may be a good number to use for planning so the customer 118 may ensure to have needed the bandwidth usage 120 at least 95% of the time, according to one embodiment.

The $95^{th}$ percentile value 130 may be a mathematical calculated cost to evaluate the regular and/or sustained use of a network connection. The $95^{th}$ percentile method of billing may be used in peering arrangements between corporate networks. The 95th percentile value 130 may or may not be used by the service provider 108 because service provider 108 may need committed information rates (CIRs) for planning purposes, according to one embodiment.

A plurality of billable units 134 may be a large amount of the billing unit(s) 116 for each of billing measurements 136 for a large scale data 138 associated with the network entity 104 by computing the $95^{th}$ percentile value. Billing measurements 136 may be collection of quantitative data of an invoice to customer(s) 118 for a large scale data associated with the network entity 104 by computing the $95^{th}$ percentile value 130, according to one embodiment.

A billing amount 140 may be the total of an invoice to customer(s) 118 for a large scale data associated with the network entity 104 based on an incremental computation 142 of the $95^{th}$ percentile value 130. An incremental computation 142 may be a software feature which, whenever a piece of data changes, may attempt to save time by only re-computing the outputs which "depend on" the changed data. The incremental computation 142 may be used to provide a very efficient and/or scalable method to automate a billing computation associated with the customer 118. The incremental computation 142 may include processing only the newest set of data 146 arrived at every run of the method, according to one embodiment.

In one embodiment, a computation 144 may be a use of computing technology in information processing. The computation 144 may not require traversing through all the data for the billing cycle 126 associated with each of a plurality of billable units 134. A newest set of data 146 may be a recently arrived collection of data. The newest set of data may be a data that arrived from an Internet network 148 between a current run 150 and a previous run 152 of a process.

An internet network 148 may be a telecommunications network which may allow computing device(s) 101 to exchange data. In internet network 148, the computing device(s) 101 may pass data to each other along with data connections. The internet network 148 may be a vast computer network linking smaller computer networks worldwide, according to one embodiment.

FIG. 1 illustrates the network entity 104 having usage data 102 may be communicatively coupled with the computing device 101 of the user 103 and the application acceleration 106 using the processor 112 and memory 114 through the internet network 148. The billing amount 140 may be associated with the $95^{th}$ percentile value 130 using the incremental computation 142, according to one embodiment.

In circle '1', a usage data 102 of a network entity 104 of an application acceleration 106 as a service provider 108 in intervals of five minutes may be sampled using a processor 112 and a memory 114. Each five minute interval 110 may be constituted a billing unit 116. In circle '2', each billing unit 116 of a customer 118 may be sorted based on bandwidth usage 120 to determine a top five percent (5%) of samples in a period 124 of a billing cycle 126. In circle '3', the top 5% of samples 122 may be designated in the period 124 of the billing cycle 126 as a burst bandwidth data 128, according to one embodiment.

In circle '4', a $95^{th}$ percentile value 130 may be automatically calculated based on a next value 132 in the billing cycle 126 after the top 5% of samples 122 in the billing cycle 126. In circle '5', the $95^{th}$ percentile value 130 of each of a plurality of billable units 134 for each of billing measurements 136 for a large scale data 138 associated with the network entity 104 may be incrementally computed by computing the $95^{th}$ percentile value 130 upon a newest set of data 146 arrived to the network entity 104 in each five minute interval 110, according to one embodiment.

In circle '6', a billing amount 140 may be determined based on an incremental computation 142 of the $95^{th}$ percentile value 130 of each of the plurality of billable units 134 for each of billing measurements for the large scale data 138 associated with the network entity 104 by a computation 144 applied only upon the newest set of data 146 arrived to the network entity 104 in each five minute interval 110. The computation 144 may not require traversing through all the data for the billing cycle 126 associated with each of a plurality billable units, according to one embodiment.

In circle '7', the incremental computation 142 may include processing only the newest set of data 146 arrived at every run of the method. The newest set of data 146 may be a data that arrived from an Internet network 148 between a current run 150 and a previous run 152 of a process, according to one embodiment.

Figure 2:
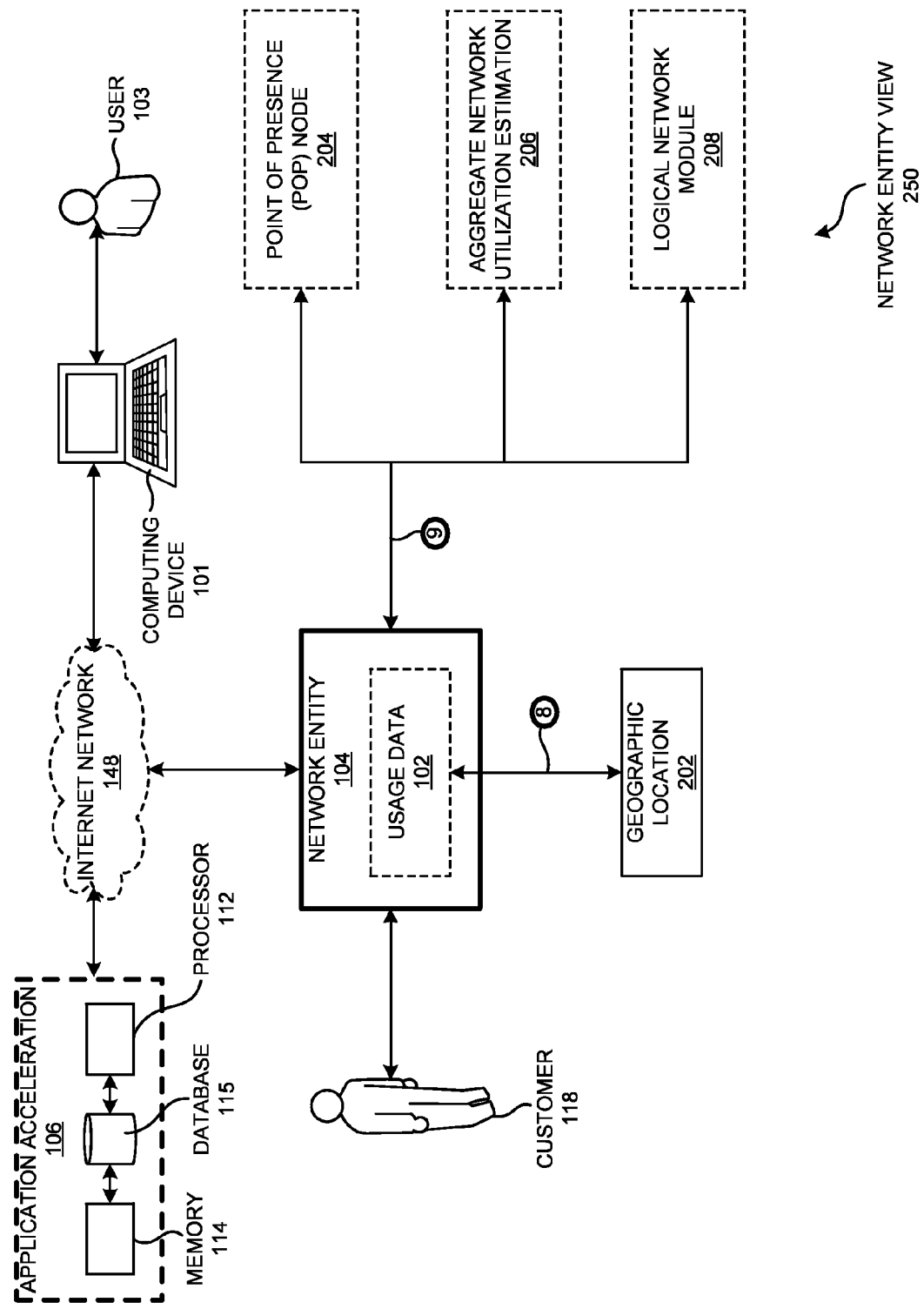
FIG. 2 is a network entity view showing possible entities in an application acceleration environment of FIG. 1, according to one embodiment.

FIG. 2 is a network entity view 250 showing possible entities in the application acceleration environment (e.g., using the application acceleration 106 of FIG. 1), according to one embodiment.

Particularly FIG. 2 builds on FIG. 1 and further adds a geographic location 202, a point of presence (POP) node 204, an aggregate network utilization estimation 206 and a logical network module 208, according to one embodiment.

A geographic location 202 may refer to a position associated with the customer 118. The geographic location 202 of the customer 118 may be defined by two coordinates (e.g., longitude and latitude). These two coordinates may be used to give specific locations independent of an outside reference point, according to one embodiment. A point of presence (POP) node 204 may be the point at which two and more different networks and/or computing device(s) 101 build a connection with each other. The point of presence (POP) node 204 may refer to an access point, location and/or facility that connects to and helps other computing device(s) 101 to establish a connection with the Internet network 148, according to one embodiment.

An aggregate network utilization estimation 206 may be a type of a network entity 104 and a value that describes the total usage of a service deployed by the customer 118 taken as a whole of the application acceleration 106 as a service. A logical network module 208 may be a rational software module that implements a specific function in a network stack (e.g., a data link interface, a transport protocol, and/or a network application). A logical network module 208 may be a provider module, a client module, and/or both, depending on where it is located in the network stack, according to one embodiment.

FIG. 2 illustrates a network entity 104 having usage data 102 that may be communicatively coupled with computing device 101 of the user 103 and the application acceleration 106 using the processor 112 and memory 114 through the internet network 148 of FIG. 1. The network entity 104 may be coupled with the geographic location 202 associated with the customer 118, according to one embodiment.

In circle '8', the usage data 102 may be sampled across each geographic location 202 and/or each network entity 104 associated with the customer 118 of the application acceleration 106 as the service provider 108. In circle '9', the network entity 104 may be a point of presence (POP) node 204 in the WAN, an aggregate network utilization estimation 206 of the customer 118 taken as a whole and/or a logical network module 208 deployed for the customer 118 across in furtherance of the application acceleration 106 as a service, according to one embodiment.

Figure 3A:
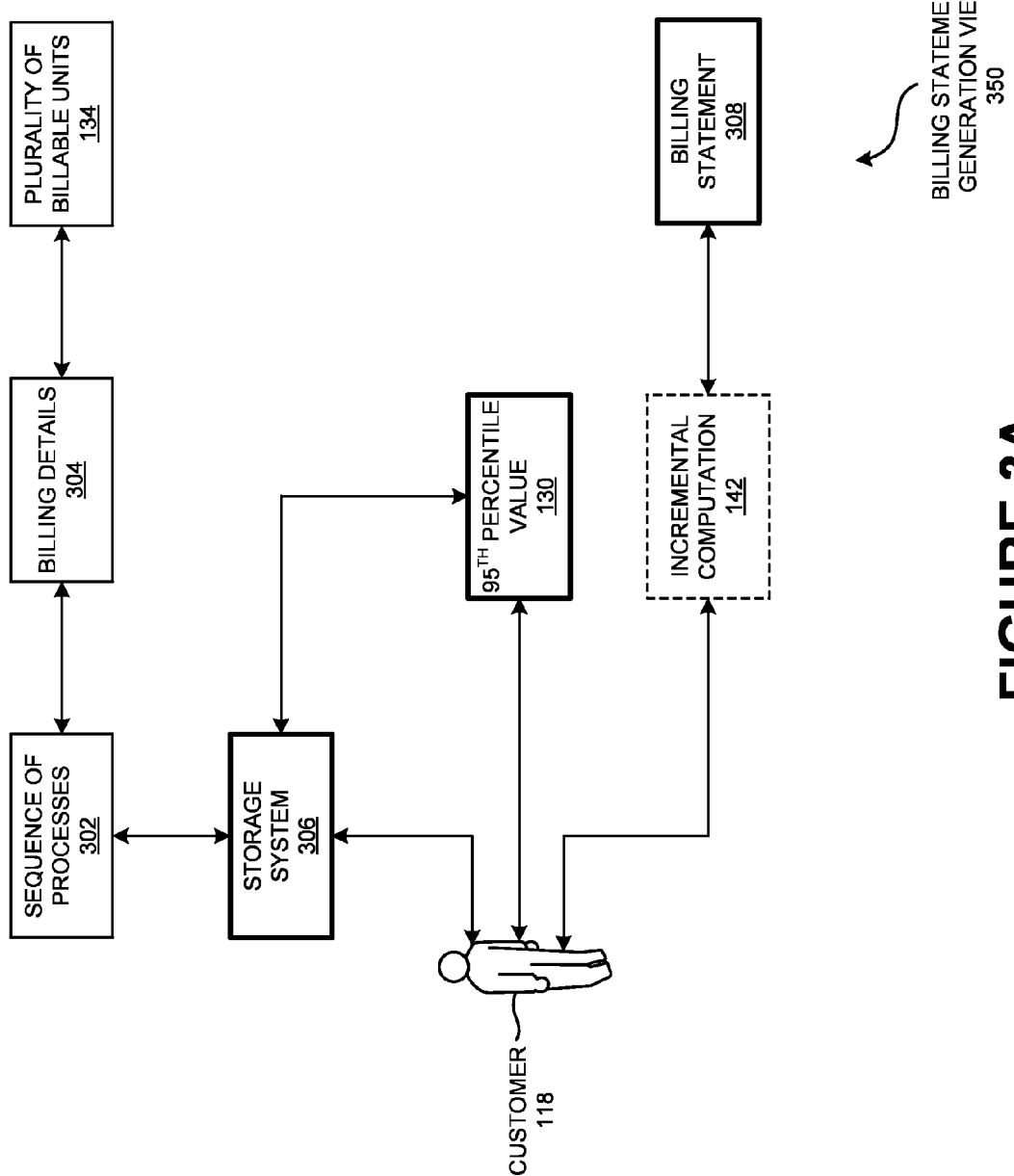
FIG. 3A is a billing statement generation view, according to one embodiment.

FIG. 3A is a billing statement generation view 350, according to one embodiment.

Particularly, FIG. 3A builds on FIG. 1 and further adds a sequence of processes 302, billing details 304, a storage system 306, a billing statement 308 and an incremental computation 142, according to one embodiment.

A sequence of processes 302 may be an ordered collection of an instance of a computer program and/or a software to run a compute of all billing details 304 across each of the plurality of billable units 134 running on the computing device 101 of FIG. 1. The billing details 304 may be a small section of an invoice to customer(s) 118 for a large scale data associated with the network entity 104 based on an incremental computation 142 of the $95^{th}$ percentile value 130 for services (e.g., application acceleration 106 as a service) considered as a unit. A storage system 306 may be an electronic holding place used to store data temporarily and/or permanently which may be connected to the computing device 101. The storage system 306 may include primary storage, which holds data in memory 114 and/or secondary storage, which holds data on hard disks, tapes, and/or other devices requiring input and/or output operations, according to one embodiment.

A billing statement 308 may list the charges that a customer 118 has accumulated over a period of billing cycle. The billing statement 308 may give a summary of activity on an account including balance, purchases, payments, credits, and/or finance charges. A billing statement 308 may be generated in real time whenever it is requested by the customer 118 on the ad hoc basis through an incremental computation 142, according to one embodiment.

FIG. 3A illustrates the generation of the billing statement 308 requested by the customer 118. The customer 118 may be associated with the $95^{th}$ percentile value 130 from the storage system 306 and the billing statement 308 through the incremental computation 142 of FIG. 1, according to one embodiment.

FIG. 3A further illustrates executing a sequence of processes 302 to run a compute of all billing details 304 across each of the plurality of billable units 134. The sequence of processes 302 may be persisted into a storage system 306. Any request to view $95^{th}$ percentile value 130 from the storage system 306 may be served in real time whenever it is requested by the customer 118 on an ad hoc basis. A billing statement 308 may be generated in real time whenever it is requested by the customer 118 on the ad hoc basis through an incremental computation 142 method, according to one embodiment.

Figure 3B:
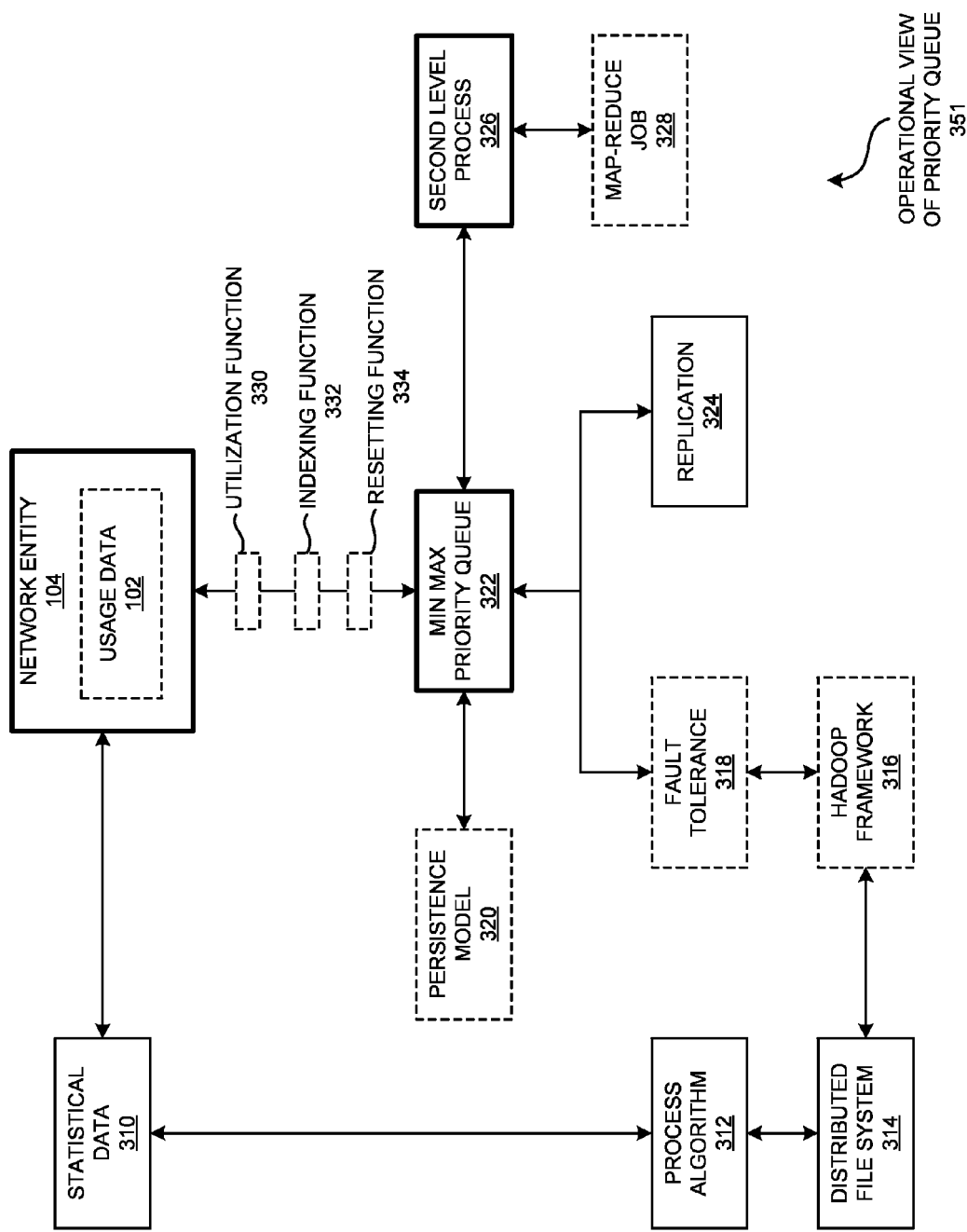
FIG. 3B is an operation view of priority queue illustrating various processes, according to one embodiment.

FIG. 3B is an operational view 351 of a min max priority queue 322 illustrating various processes, according to one embodiment.

Particularly, FIG. 3B builds on FIG. 1 and further adds a statistical data 310, a process algorithm 312, a distributed file system 314, a Hadoop framework 316, a fault tolerance 318, a persistence model 320, a min max priority queue 322, a replication 324, a second level process 326, a map-reduce job 328, an utilization function 330, an indexing function 332, and a resetting function 334, according to one embodiment.

A statistical data 310 may be distinct information to collect, analyze, interpret and/or explain, and present a data (relating to the use of statistics). A statistical data 310 may be collected for all the network entities (e.g., the network entity 104) served. A process algorithm 312 may be a specific and/or logical procedure to be followed in order to communicate the data into a distributed file system 314, according to one embodiment.

A distributed file system 314 may be a client/server-based application that allows clients (e.g., customer(s) 118) to access and/or process data stored on the server as if it were on their own computer (e.g., computing device 101). The distributed file system 314 may provide location transparency and/or redundancy to improve data availability in the face of failure and/or heavy load by allowing shares in multiple different locations to be logically grouped under one folder and the distributed file system 314 may be a root, according to one embodiment.

A Hadoop framework 316 may be an open source software project that enables distributed processing of large scale data 138 across clusters of commodity servers. A Hadoop framework 316 may be designed to scale up from a single server to thousands of machines (e.g., computing device(s) 101), with very high degree of fault tolerance 318. Rather than relying on high-end hardware, the resiliency of these clusters may come from the software's ability to detect and handle failures at the application layer (e.g., application acceleration 106). A Hadoop framework 316 may be a part of the Apache project sponsored by the Apache Software Foundation, according to one embodiment.

A fault tolerance 318 may be a setup and/or configuration that prevent a computer (e.g., the computing device 101) and/or network device from failing in the event of an unexpected problem and/or error. The fault tolerance 318 may be provided with software, embedded in hardware, and/or provided by some combination. A persistence model 320 may be a representation of a network stack to facilitate analysis and monitoring of the network. A persistence model 320 may be utilized including bounded min max priority queue 322 to attain the fault tolerance 318 and replication 324, according to one embodiment.

A min max priority queue 322 may be an abstract data type which is like a regular queue and/or stack data structure. In the min max priority queue 322, an element with high priority may be served before an element with low priority. If two elements may have the same priority, they are served according to their order in the queue, according to one embodiment.

A replication 324 may be the process of creating and/or managing duplicate versions of the database 115. The replication 324 may not only copy the database 115 but also synchronize a set of replica. The changes made to one replica are reflected in all the others. The replication 324 may enables many user(s) 103 to work with their own local copy of the database 115 but have the database 115 updated as if they were working on a single, centralized database. For database applications (e.g., the application acceleration 106 as a service) where user(s) 103 may be geographically widely distributed, replication 324 may be the most efficient method of database access, according to one embodiment.

A second level process 326 may be a series of actions and/or steps taken in order to define a sequence of a map-reduce job 328 that further processes the data. A map-reduce job 328 may be a software framework that allows developers to write programs that process massive amounts of unstructured data in parallel across a distributed cluster of processor(s) 112 and/or stand-alone computers (e.g., the computing device 101), according to one embodiment.

FIG. 3B illustrates the network entity 104 having usage data 102 may be coupled to a statistical data 310 and the min max priority queue 322. The second level process 326 may be associated with the min max priority queue 322.

FIG. 3B illustrates a process algorithm 312 may be applied to communicate the data into a distributed file system 314. A Hadoop framework 316 may be utilized to provide fault tolerance 318 to the data and/or provide parallel computation of a billing network across all entities.

The utilization function 330 may be the set of instructions to utilize a persistence model 320 that includes bounded min max priority queue 322 to attain the fault tolerance 318 and/or replication 324. The indexing function 332 may be the set of instructions to record a queue for each and/or every entity. The resetting function 334 may be the set of instructions to rearrange the queue for each network entity 104. A second level process 326 may be evoked to define a sequence of a map-reduce job 328 that further processes the data, according to one embodiment.

Figure 4:
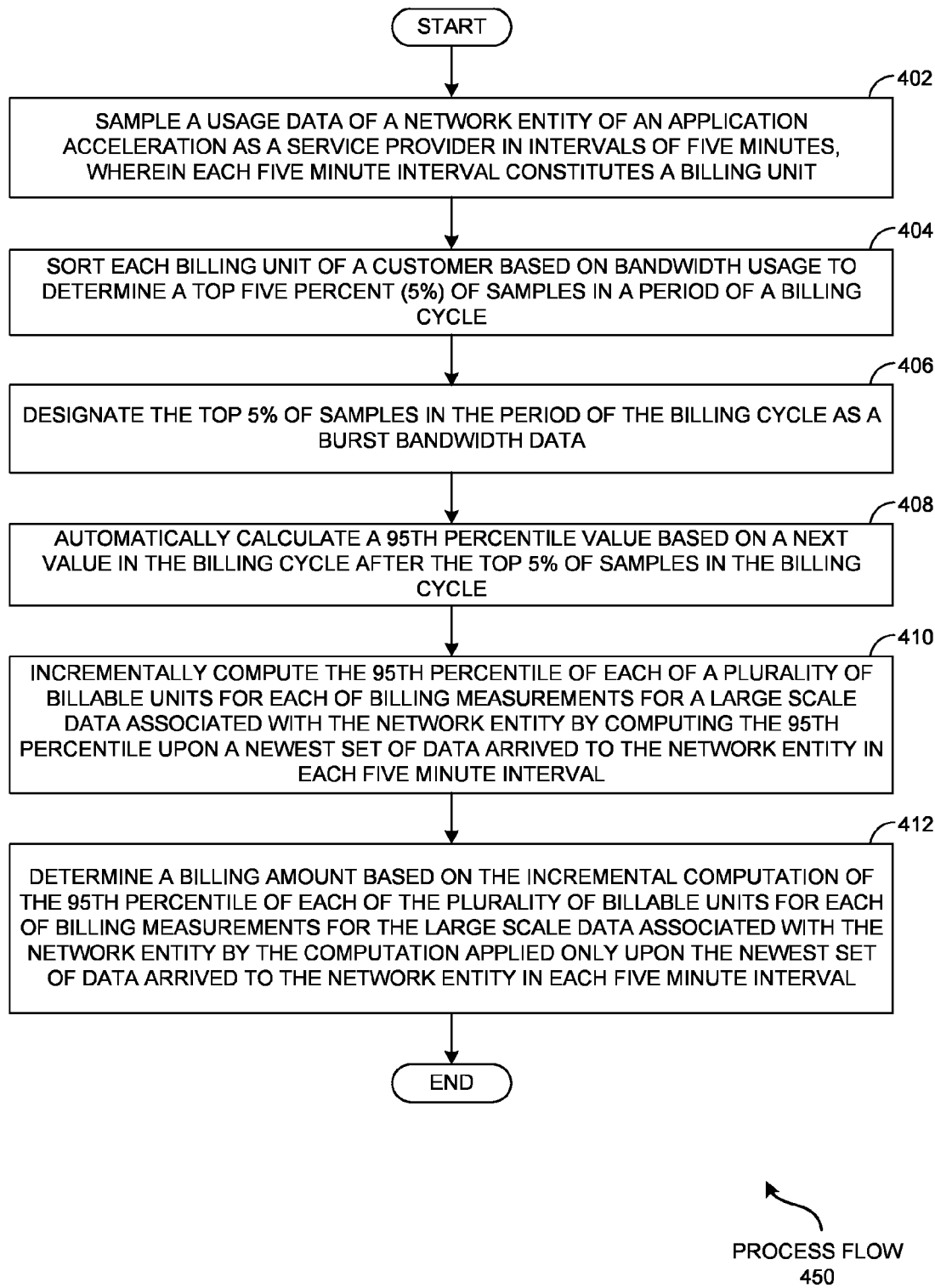
FIG. 4 is a process flow determining a billing amount based on the incremental computation of FIG. 1, according to one embodiment.

FIG. 4 is a process flow 450 determining a billing amount 140 based on the incremental computation 142 of FIG. 1, according to one embodiment.

In operation 402, a usage data 102 of a network entity 104 of an application acceleration 106 as a service provider 108 in intervals of five minutes (e.g., using the five minute interval 110) may be sampled using a processor 112 and a memory 114, wherein each five minute interval 110 constitutes a billing unit 116. In operation 404, each billing unit 116 of a customer 118 may be sorted based on bandwidth usage 120 to determine a top five percent (5%) of samples 122 in a period 124 of a billing cycle 126. In operation 406, the top 5% of samples 122 may be designated in the period 124 of the billing cycle 126 as a burst bandwidth data 128.

In operation 408, a $95^{th}$ percentile value 130 may be automatically calculated based on a next value 132 in the billing cycle 126 after the top 5% of samples 122 in the billing cycle 126. In operation 410, the $95^{th}$ percentile of each of a plurality of billable units 134 for each of billing measurements 136 for a large scale data 138 may be incrementally computed associated with the network entity 104 by computing the $95^{th}$ percentile upon a newest set of data 146 arrived to the network entity 104 in each five minute interval 110.

In operation 412, a billing amount 140 may be determined based on an incremental computation 142 of the $95^{th}$ percentile of each of the plurality of billable units 134 for each of billing measurements 136 for the large scale data 138 associated with the network entity 104 by a computation 144 applied only upon the newest set of data 146 arrived to the network entity 104 in each five minute interval 110.

Figure 5:
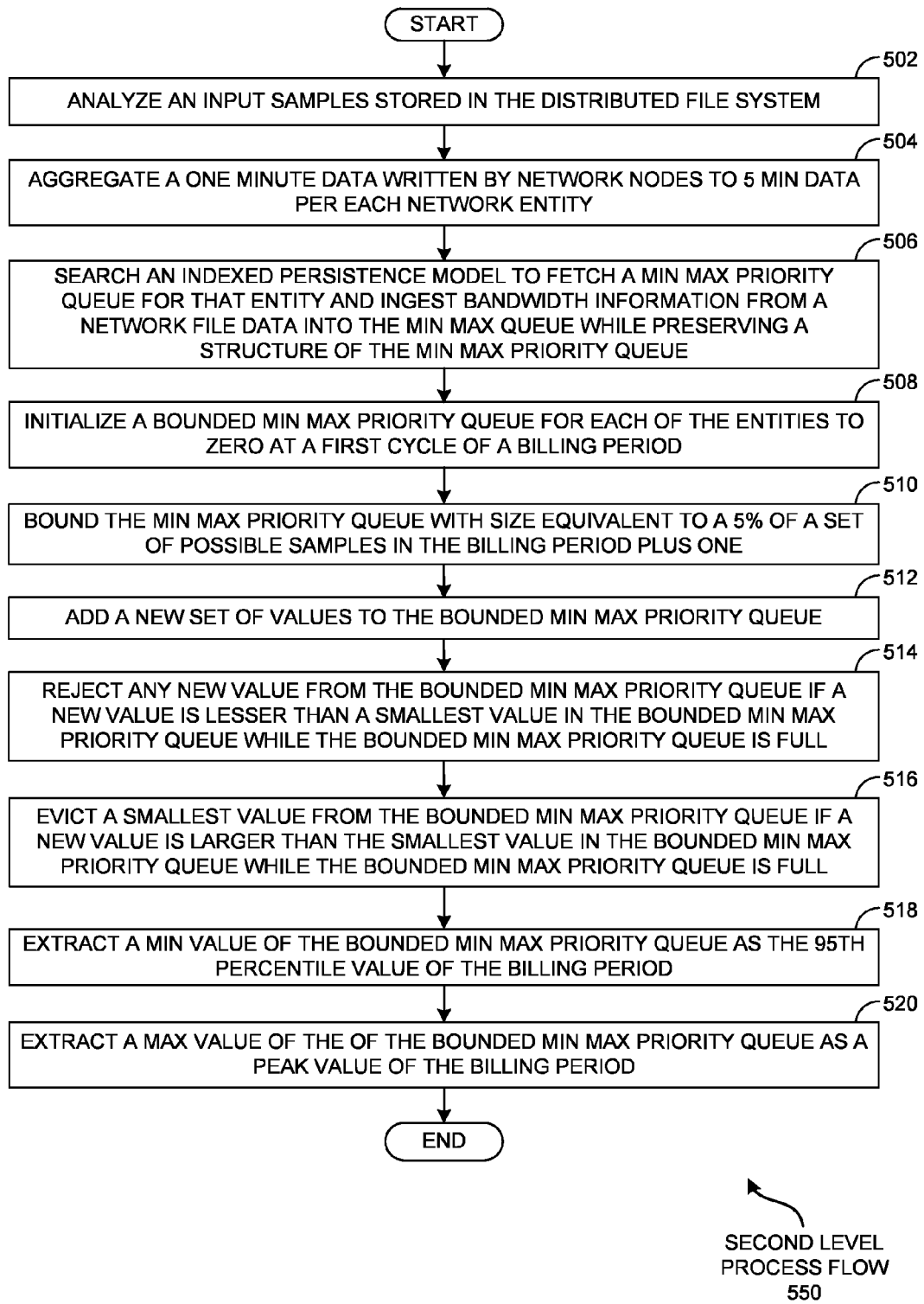
FIG. 5 is a second level process flow extracting min and max values of the min max priority queue of FIG. 3B, according to one embodiment.

FIG. 5 is a second level process flow 550 extracting min and max values of the min max priority queue 322 of FIG. 3B, according to one embodiment.

In operation 502, an input samples stored in a distributed file system 314 may be analyzed. In operation 504, a one minute data written by network nodes to 5 min data per each network entity 104 may be aggregated. In operation 506, an indexed persistence model (e.g., using persistence model 320) may be searched to fetch a min max priority queue 322 for that entity and ingest bandwidth information from a network file data into a min max queue while preserving a structure of the min max priority queue 322.

In operation 508, a bounded min max priority queue 322 for each of the entities may be initialized to zero at a first cycle of a billing period (e.g., using the period 124). In operation 510, the min max priority queue 322 may be bounded with size equivalent to a 5% of a set of possible samples in the billing period (e.g., using the period 124) plus one. In operation 512, a new set of values may be added to the bounded min max priority queue 322. In operation 514, any new value from the bounded min max priority queue 322 may be rejected if the new value is lesser than a smallest value in the bounded min max priority queue 322 while the bounded min max priority queue 322 is full.

In operation 516, the smallest value from the bounded min max priority queue 322 may be evicted if the new value is larger than the smallest value in the bounded min max priority queue 322 while the bounded min max priority queue 322 is full. In operation 518, a min value of the bounded min max priority queue 322 as the $95^{th}$ percentile value 130 of the billing period (e.g., using the period 124) may be extracted. In operation 520, a max value of the bounded min max priority queue 322 as a peak value of the billing period (e.g., using the period 124) may be extracted.

Figure 6:
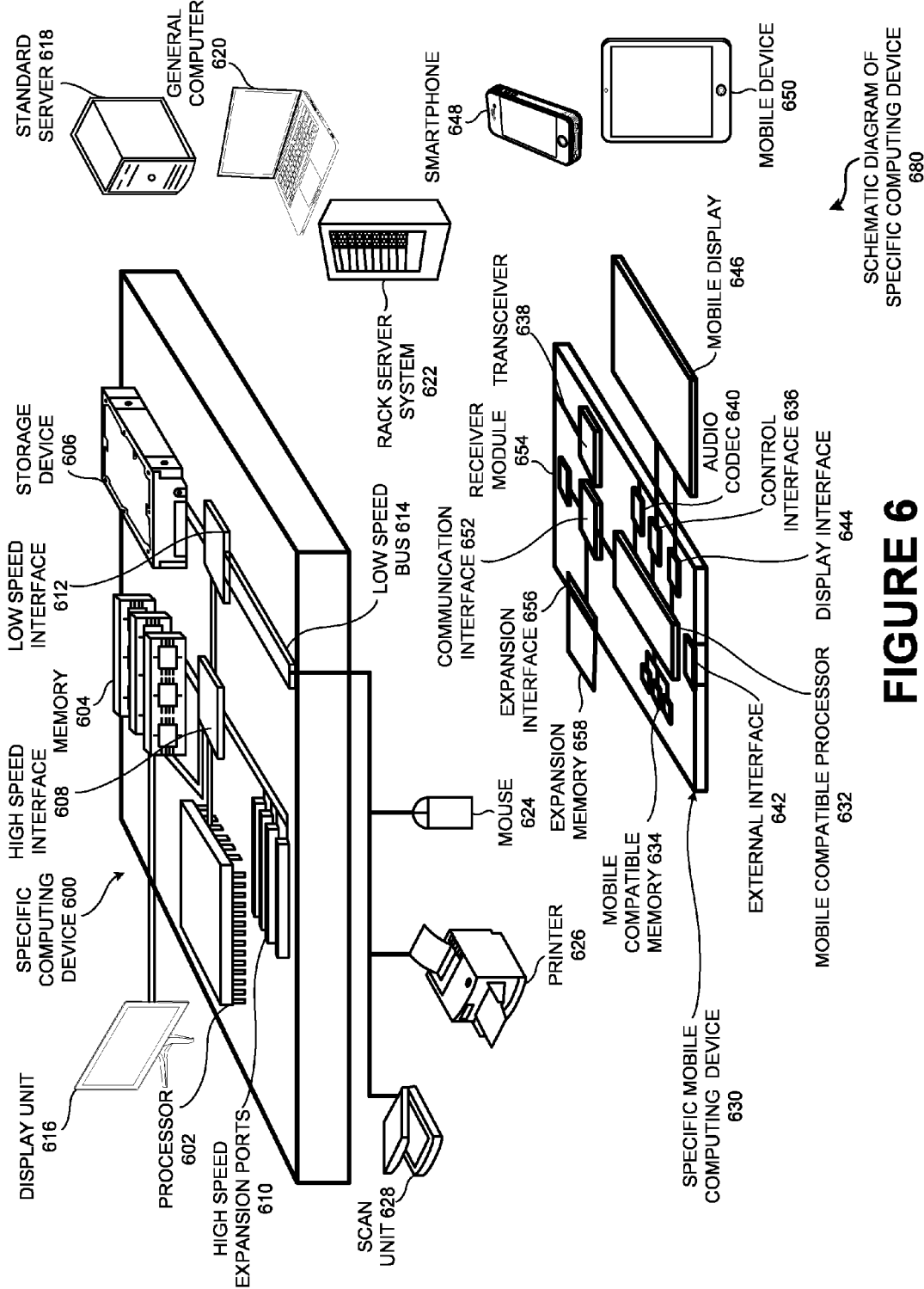
FIG. 6 is a schematic diagram of a specific computing device that can be used to implement the methods and systems, according to one embodiment.

FIG. 6 is a schematic diagram 680 of the specific computing devices 600 and a specific mobile computing device 630 (e.g., mobile devices and/or desktop devices) that can be used to perform and/or implement any of the embodiments disclosed herein. In one or more embodiments, application acceleration 106 and/or computing device 101 of FIG. 1A may be the specific computing devices 600.

The specific computing devices 600 may represent various forms of digital computers, such as laptops, desktops, workstations, personal digital assistants, servers, blade servers, mainframes, and/or other appropriate computers. The specific mobile computing device 630 may represent various forms of mobile device(s) 650, such as smartphones, camera phones, personal digital assistants, cellular telephones, and other similar mobile device(s) 650. The components shown here, their connections, couples, and relationships, and their functions, are meant to be exemplary only, and are not meant to limit the embodiments described and/or claimed.

The specific computing devices 600 may include a processor 602, a memory 604, a storage device 606, a high speed interface 608 coupled to the memory 604 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate.

The processor 602 may process instructions for execution in the specific computing devices 600, including instructions stored in the memory 604 and/or on the storage device 606 to display a graphical information for a GUI on an external input/output device, such as a display unit 616 coupled to the high speed interface 608. In other embodiments, multiple processor(s) 602 and/or multiple buses may be used, as appropriate, along with multiple memories and/or types of memory 604. Also, a plurality of specific computing devices 600 may be coupled with, with each device providing portions of the necessary operations (e.g., as a server bank, a group of blade servers, and/or a multi-processor system).

The memory 604 may be coupled to the specific computing devices 600. In one embodiment, the memory 604 may be a volatile memory. In another embodiment, the memory 604 may be a non-volatile memory. The memory 604 may also be another form of computer-readable medium, such as a magnetic and/or an optical disk. The storage device 606 may be capable of providing mass storage for the specific computing devices 600.

In one embodiment, the storage device 606 may be included of a floppy disk device, a hard disk device, an optical disk device, a tape device, a flash memory and/or other similar solid state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be included of instructions that, when executed, perform one or more methods, such as those described above. The instructions may be stored in the memory 604, the storage device 606, a memory 604 coupled to the processor 602, and/or a propagated signal.

The high speed interface 608 may manage bandwidth-intensive operations for the specific computing devices 600, while the low speed interface 612 may manage lower bandwidth-intensive operations. Such allocation of functions is exemplary only. In one embodiment, the high speed interface 608 may be coupled to the memory 604, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be included of a wired and/or wireless communication port (e.g., a Universal Serial Bus ("USB"), a Bluetooth® port, an Ethernet port, and/or a wireless Ethernet port). The low speed bus 614 may also be coupled to scan unit 628, a printer 626, a keyboard, a mouse 624, and a networking device (e.g., a switch and/or a router) through a network adapter.

The specific computing devices 600 may be implemented in a number of different forms, as shown in the Figure. In one embodiment, the specific computing devices 600 may be implemented as a standard server 618 and/or a group of such servers. In another embodiment, the specific computing devices 600 may be implemented as part of a rack server system 622. In yet another embodiment, the specific computing devices 600 may be implemented as a general computer 620 such as a laptop and/or desktop computer. Alternatively, a component from the specific computing devices 600 may be combined with another component in a specific mobile computing device 630.

In one or more embodiments, an entire system may be made up of a plurality of specific computing devices 600 and/or a plurality of specific computing devices 600 coupled to a plurality of specific mobile computing device 630.

In one embodiment, the specific mobile computing device 630 may include a mobile compatible processor 632, a mobile compatible memory 634, and an input/output device such as a mobile display 646, a communication interface 652, and a transceiver 638, among other components. The specific mobile computing device 630 may also be provided with a storage device, such as a Microdrive and/or other device, to provide additional storage. In one embodiment, the components indicated heretofore are inter-coupled using various buses, and several of the components may be mounted on a common motherboard.

The mobile compatible processor 632 may execute instructions in the specific mobile computing device 630, including instructions stored in the mobile compatible memory 634. The mobile compatible processor 632 may be implemented as a chipset of chips that include separate and multiple analog and digital processors. The mobile compatible processor 632 may provide, for example, for coordination of the other components of the specific mobile computing device 630, such as control of user interfaces, applications run by the specific mobile computing device 630, and wireless communication by the specific mobile computing device 630.

The mobile compatible processor 632 may communicate with a user 103 through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may include appropriate circuitry for driving the mobile display 646 to present graphical and other information to a user 103.

The control interface 636 may receive commands from a user 103 and convert them for submission to the mobile compatible processor 632. In addition, an external interface 642 may be provided in communication with the mobile compatible processor 632, so as to enable near area communication of the specific mobile computing device 630 with other devices. External interface 642 may provide, for example, for wired communication in some embodiments, and/or for wireless communication in other embodiments, and multiple interfaces may also be used.

The mobile compatible memory 634 may be coupled to the specific mobile computing device 630. The mobile compatible memory 634 may be implemented as a volatile memory and a non-volatile memory. The expansion memory 658 may also be coupled to the specific mobile computing device 630 through the expansion interface 656, which may include, for example, a Single In Line Memory Module ("SIMM") card interface. The expansion memory 658 may provide extra storage space for the specific mobile computing device 630, and/or may also store an application and/or other information for the specific mobile computing device 630.

Specifically, the expansion memory 658 may include instructions to carry out the processes described above. The expansion memory 658 may also include secure information. For example, the expansion memory 658 may be provided as a security module for the specific mobile computing device 630, and may be programmed with instructions that permit secure use of the specific mobile computing device 630. In addition, a secure application may be provided on the SIMM card, along with additional information, such as placing identifying information on the SIMM card in a non-hackable manner.

The mobile compatible memory 634 may include a volatile memory (e.g., a flash memory) and a non-volatile memory (e.g., a non-volatile random-access memory ("NVRAM")). In one embodiment, a computer program includes a set of instructions that, when executed, perform one or more methods. The set of instructions may be stored on the mobile compatible memory 634, the expansion memory 658, a memory coupled to the mobile compatible processor 632, and a propagated signal that may be received, for example, over the transceiver 638 and/or the external interface 642.

The specific mobile computing device 630 may communicate wirelessly through the communication interface 652, which may be included of a digital signal processing circuitry. The communication interface 652 may provide for communications using various modes and/or protocols, such as: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module 654 may provide additional navigation-related and location-related wireless data to the specific mobile computing device 630, which may be used as appropriate by a software application running on the specific mobile computing device 630.

The specific mobile computing device 630 may also communicate audibly using an audio codec 640, which may receive spoken information from a user 103 and convert it to usable digital information. The audio codec 640 may likewise generate audible sound for a user 103, such as through a speaker (e.g., in a handset of the specific mobile computing device 630). Such a sound may include a sound from a voice telephone call, a recorded sound (e.g., a voice message, a music files, etc.) and may also include a sound generated by an application operating on the specific mobile computing device 630.

The specific mobile computing device 630 may be implemented in a number of different forms, as shown in the Figure. In one embodiment, the specific mobile computing device 630 may be implemented as a smartphone 648. In another embodiment, the specific mobile computing device 630 may be implemented as a personal digital assistant ("PDA"). In yet another embodiment, the specific mobile computing device 630 may be implemented as a tablet device.

Figure 7:
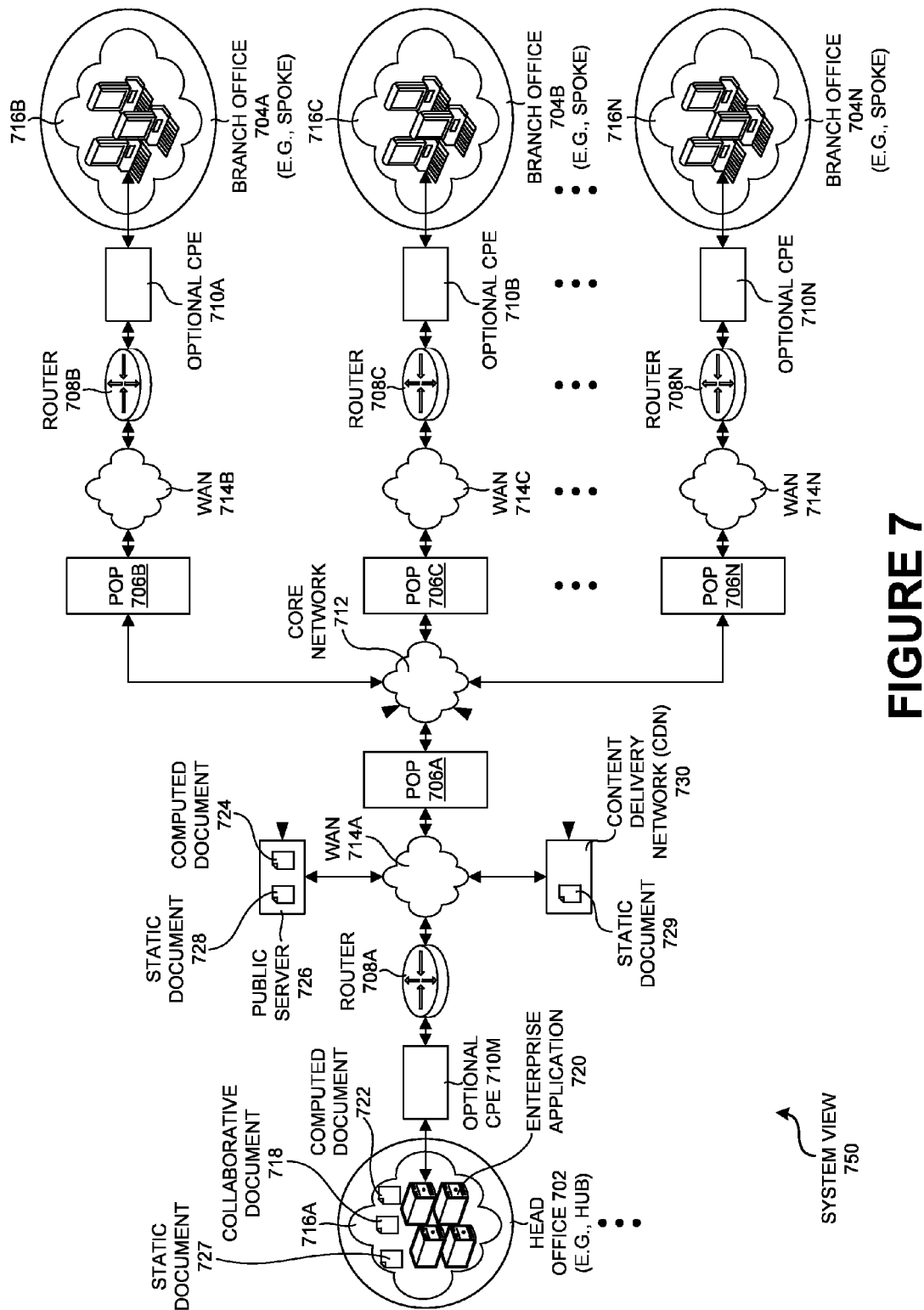
FIG. 7 is a system view illustrating implementation of the application acceleration as a service, according to one embodiment.

FIG. 7 is a system view 750 illustrating implementation of application acceleration as a service, according to one embodiment. In particular, a system in FIG. 1 illustrates a head office 702, a branch office 704A-N, Points Of Presence (POP) locations 706A-N, a router 708A-N, a Customer Premise Equipment (CPE) 710A-N, a core network 712, a WAN 714A-B, a LAN 716A-B, a collaborative document 718, an enterprise application 720, a computed document 722-724, a public server 726, static document 727-729, and Content Delivery Network (CDN) 730, according to one embodiment. It will be appreciated that while one head office 702 is illustrated, the various embodiments disclosed herein can apply in scenarios in which there are multiple head offices and/or multiple branch offices.

Each of the POP location(s) 706A-N may be access points to the Internet. For example, each of the POP location(s) 706A-N may be physical locations that house servers, routers, ATM switches and digital/analog call aggregators. Each POP location(s) 706A-N may be either part of the facilities of a telecommunications provider that the Internet service provider (ISP) rents and/or a location separate from the telecommunications provider. ISPs may have multiple POP locations, sometimes numbering in the thousands. The POP location(s) 706A-N may also be located at Internet exchange points and co-location centers.

A business entity may include the head office 702 (or more head offices) and multiple branch office(s) 704A-N. The branch office(s) 704A-N may be spread across different geographies (e.g., regions, countries). The head office 702 and the branch office(s) 704A-N may be communicatively coupled through the WAN 714A-N. The WAN 714A-N between the head office 702 and the branch office(s) 704A-N may be enabled through a variety of networking protocols (e.g., Ethernet, Fractional T1/E1, T1/E1, Digital Signal 3 (DS3), Integrated Services Digital Network (ISDN), broadband (e.g., Digital Subscriber Line (DSL), cable, etc.), satellite). In one or more embodiments, the WAN 714A-N may be leased lines or Internet (e.g., egress/ingress only). In one embodiment, the head office 702 (or more head offices), the branch office(s) 704A-N, the public server 726 may communicate with each other through a private network, and/or the public network. The core network 712 may include the private network and the public network. In one or more embodiments, the core network 712 may use WAN 714A-N/Internet to communicate with the POP location(s) 706A-N, the external services (e.g., such as the service providers 806-808 of FIG. 8), the public server 726 and the CDN 730.

The head office 702 may serve the enterprise application 720, comprised of the collaborative document 718. The enterprise application 720 may be an internal application of the business entity (e.g., that includes one or more head office(s) 702 and one or more associated branch office(s) 704A-N). The head office 702 and the branch office(s) 704A-N may securely share (e.g., access, modify, etc.) the enterprise application(s) 720 (e.g., Enterprise Resource Planning (ERP), Customer Relationship Management (CRM), e-mail and ftp, voice and video, remote file systems, centralized backup, etc.) over the WAN 714A-N, through a private network using any of public addresses of source and destination routers, pools of addresses represented by a firewall, using a Multiprotocol Label Switching (MPLS) label, and using a Virtual Local Area Network (VLAN) tag. The collaborative document 718 (e.g. Microsoft® Word documents, Microsoft® Excel documents) may be documents that are accessed and simultaneously modified by a number of different users at the branch office 704A-N on a frequent basis through the core network 712 (e.g., through the private network in the core network 712). For example, a collaborative document may be a large structured (e.g. spreadsheet) file and/or an unstructured (e.g. word processing) file simultaneously and frequently accessed and modified by users across head office and branch offices of the same organization (e.g., same business, institution, etc.). In one embodiment, the branch office 704A-N (e.g., also known as requesting entity) may request for the collaborative document(s) 718, the computed document 722-724 and/or the static document 727-729 service from the head office 702. The branch office 704A-N may include several computing devices that access/modify the collaborative document(s) 718 in the computing devices managed by processors.

The requesting entities will be described. Particularly, requesting entities (e.g., devices at branch office(s) 704A-N) may be desktops and/or laptops running client applications like Windows Explorer, Microsoft® Word®, Internet Explorer®, etc. and open client connections to servers at head offices such as the head office 702. Data communication (e.g., such as the communication of the collaborative document, the static document and/or the computed document) between the head office 702 and the branch office(s) 704A-N may be accelerated using application acceleration services disclosed herein, according to one embodiment. In one or more embodiments, the POP location(s) 706A-N and the optional CPE 710A-N may perform protocol dependent proxy function (e.g., singly or split across POPs and optional CPEs) to resolve bandwidth limitation or communication time reduction by simplifying the protocol or anticipating requests on behalf of the branch office users. A combination of protocol dependent and protocol independent functions to solve bandwidth reduction and/or communication time reduction may be defined as the application acceleration function. When the aforementioned functions are delivered as a service, the service may be called application acceleration as a service.

The serving entities will be described. Particularly, serving entities (e.g., the head office 702) may include servers that host and run the enterprise applications over the WAN 714A-N. The servers may include the file servers, the mail servers, the web servers, public servers, etc. The head office 702 may also include other devices like storage devices, networking devices, etc. The servers and other devices in the head office 702 may be communicatively coupled with other servers and devices in the head office 702 through the LAN 716A. The enterprise application 720 may communicate the collaborative document 718, the computed document(s) 722-724, and other the static document(s) 727-729 to the branch office(s) 704A-N through a transport stream (e.g., TCP) and/or a packet stream (e.g., IP). The transport stream and/or the packet stream may be routed through the POP location(s) 706A-N. Furthermore, the transport stream and/or the packet stream may be routed in the secure tunnels to destinations via the POP location(s) 706A-N. In one or more embodiments, the public server 726 may generate and host the computed document 724 and/or the static document. The computed document 724 (e.g. HTML and XML) may be generated based on a recent interaction between the public server 726 and the branch office during a secure session (e.g., HTTPS) of the public network. In addition, the computed document 724 may be the document that may be generated based on response to a public page (e.g., response page). In one or more embodiments, the computed document 724 may be custom created for a particular user. For example, a computed document may be a confirmation page of a commerce website that is custom created for a user immediately after a recent purchase during a secure session. In one or more embodiments, the CDN 730 may be used to optionally host the static documents to reduce the amount of data communicated between the head office 702 and the branch office(s) 704A-N. The CDN 730 may be a system of computers networked together across the core network 712 that may cooperate transparently to distribute content for the purposes of improving performance and scalability. The CDN 730 may not host the computed document 724 as hosting becomes inefficient.

In one embodiment, the computed document(s) 722 may also be generated in the head office 702 and hosted by the public server 726. The static document 727 may be a copy of a content data that may be frequently accessed by the branch office(s) 704A-N. For example, the static document 727 may be a web page that does not change very often such as a content data of the webpage, landing page of a website etc. provided by the head office to all the branch office(s) 704A-N. In an alternate embodiment, the enterprise application 720 may be executed directly from any of the POP location(s) 706A-N rather than from the head office 702.

Similarly, devices at the branch office(s) 704A-N may be communicatively coupled with other devices in the branch office(s) 704A-N through the internal local network 716B-N respectively. The router 708A-B may be a networking device that performs a task of routing and forwarding information to destinations. The router 708A-N may communicate data and/or information between the WAN 714A-N and the LAN 716A-N of the head office 702 the branch office 704A-N. The POP 706A-N may be a pool of servers providing WAN optimization and application acceleration. The POP location(s) 706A-N may be communicatively coupled to each other directly or indirectly through the core network 712. Both the core network 712 and WAN 714A-N may use leased lines and/or Internet. The core network 712 that carries the transport streams and the packet streams may also be compressed.

The private network (e.g., of the core network 712) may be a network that uses private Internet Protocol (IP) addresses based on specified standard (e.g., RFC 1918, RFC 4193, etc.). The POP location(s) 706A-N may route the transport streams and/or the packet streams that includes the collaborative document 718, and/or the computed document 722-724 on behalf of the head office 702 from a closest POP location to the head office 702 (e.g., the POP 706A as illustrated) to a closest POP location 706B-N to the branch office 704A-N and then onward to the branch office 704A-N. Furthermore, the POP 706A may route the static document 727 on behalf of the public server 726 to the branch office 704A-N through the transport stream and/or packet stream. The private network may use Network Address Translation (NAT) gateway, or a proxy server for connecting to the public network in the core network 712.

The optional CPE 710A-N (e.g., Aryaka™ CPE) may be a device installed at the branch office 704 and/or the head office 702 for performing WAN Advanced Redundancy Removal™ (ARR). It should be noted that Aryaka™ and Advanced Redundancy Removal™ are pending U.S. federal trademarks of Aryaka, Inc. and all rights are reserved to these names.

The optional CPE 710A-N may be configured to perform secure transport of data and communicate the secured data (e.g., collaborative document 718 and the enterprise application 720) between client devices in the branch office 704A-N and the head office(s) 702, with optional intervening firewalls, through Internet Protocol Security (IPsec) tunnel, a Specific Routing Encapsulation (GRE) tunnel, VLANs, and MPLS labels using IP headers. In addition to the optional CPE, an optional branch router, and an optional head-office router (not shown in figure) may be user to perform the ARR, generation of secure transport data and communication of secure transport data over secure channels. Use of the optional CPE 710A-N may enable resolving bandwidth limitation in first/last mile.

The first mile may be a link between the closest POP location 706B-N to the branch office 704B-N and the branch office 704B-N. The last mile (e.g., also referred as second mile) may be a link between the closest POP location(s) 706A to the head office 702 and the head office 702. The optional CPE 710A-N may reduce communication time of the collaborative document 718, the computed document 722-724, and/or the static document 727 in the link between the closest POP location 706B-N to the branch office 704B-N and the branch office 704B-N by resolving bandwidth limitation in the first mile. The optional CPE 710A-N may reduce communication time of the collaborative document 718 and the enterprise application 720 in the link between the closest POP location(s) 706A to the head office 702 and the head office 702 by resolving bandwidth limitation in the last mile.

The use of the optional CPE 710A-N may enable faster data communication in the branch office 704A-N or the head office 702 if the communication line has a low bandwidth. However, if the branch office 704A-N and/or the head office 702 have sufficient bandwidth for data communication, the use of the optional CPE 710A-N may not be required. The POP 706A-N and the optional CPE 710A-N may have storage capabilities for performing Advanced Redundancy Removal for communicating data. The storage in the optional CPE 710A-N may be used for Advanced Redundancy Removal of data to reduce the amount of data flow. The storage in the optional CPE 710A-N may be a flash memory device, according to one embodiment. In alternate embodiments, the optional CPE 710A-N may be coupled or have internally within other types of non-volatile storage devices that includes hard drives, flash drives, solid state devices, etc. Protocol proxies (CIFS, MAPI, HTTP/HTTPS, FTP, PRINT, RTMP, RTP, Oracle, etc.) may be implemented within the POP 706A-N and/or the optional CPE 710A-N.

Usage of the POP 706A-B may eliminate the requirement of having intelligent synchronized WAN optimization equipments for solving latency and bandwidth at the head office 702 and the branch office 704 ends, according to one embodiment. In addition, the use of the Multiprotocol Label Switching (MPLS) may be eliminated at the core network 712 as the POP location(s) 706A-B speeds up the data communication with no loss in packets and/or delay, according to one embodiment. According to one embodiment, the modified architecture may now be spread across the network with control over data from end to end. As a result, applications such as basic office documents (e.g., spreadsheets, word processing files, etc.), web applications (e.g., detail locators, catalogs, store locators, etc.), Internet applications, etc. may be accelerated through the acceleration as service, according to one embodiment. Large enterprise applications may also be accelerated using the POP location(s) 706A-N. Acceleration of data may be possible as the POP location(s) 706A-N are intelligently designed to analyze the destination of the data packet and to communicate the data packet to the destination without compromising and/or modifying client's private networks.

Figure 8:
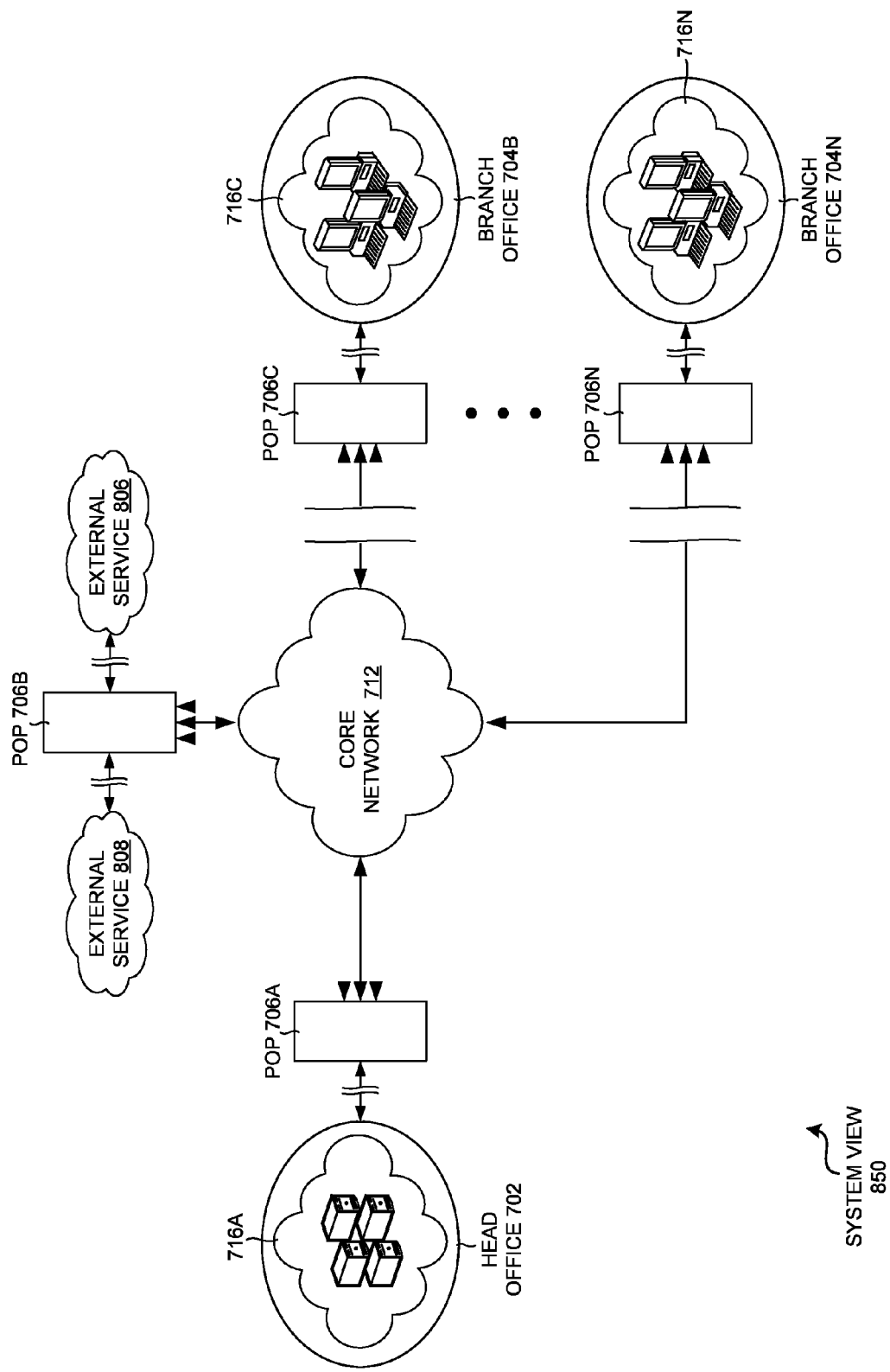
FIG. 8 is a system view illustrating multi segment pop-pop architecture, according to one embodiment.

FIG. 8 is a system view 850 illustrating multi segment pop-pop architecture, according to one embodiment. The POP location(s) 706A-N may be installed in various geographical locations (e.g., around the country, around the world, etc.). The POP location(s) 706A-N may be communicatively coupled to each other directly or indirectly through a public network or a private network. In particular, the POP location(s) 706A-N may be installed "close" to the location of the customer premises. For example, there may be a head office in San Francisco and branch offices in London and Geneva. The POPs may be installed in San Francisco, London, and Geneva. If the Geneva office requires transmission of large data to the London office, then the Geneva office may directly communicate the data to the London office without even going through the head office in San Francisco. The POP of the Geneva may intelligently identify the end destination as London, thereby communicating the data directly to the London POP. The POP locations closest to the branch offices and/or head office(s) may be determined before traffic is sent (e.g., pre-provisioned) and/or when traffic is sent (e.g., dynamic). The intermediate POP location(s) 706B can also be determined via pre-provisioned and/or dynamic techniques. However, it should be noted that the system may enable the business entity to communicate the data through the head office also.

The POP 706A-N may form a part of a core region. The core region may be a cloud and/or interconnection of networks through which the communication occurs. In an example embodiment, the client edge region may be a location within physical premises of either the head office 702 and/or the physical premises of the branch office(s) 704.

In an embodiment, a segment may be a communication link between the POP and other POPs. For example, the segment may be an Internet or private point-point leased line. Policies may be assigned per segment. The POP location(s) 706A-N may be communicatively coupled to each other through transport network. Since, the POP location(s) 706A-N are communicatively coupled to each other directly/indirectly, there may be multiple segments. Therefore, the architecture in the system may be called as multi-segment architecture. Also, communication link between each of nodes may also be called as segment. The multi-segment architecture may be based on layer 3 (network layer)/layer 4 (transport layer). Subsequently, this disclosure calls the layer-3 segmentation bypass mode packets and layer-4 segmentation intercept mode packets (using TCP proxies). The multi-segmented architecture may enable each segment to have different queuing and routing policies based on cost and congestion.

In addition, the system as described in the disclosure may include Transmission Control Protocol (TCP) proxies (e.g., at layer 4) at each segment. ACKs of TCP proxies are acknowledged by immediately following segment which may significantly reduce congestion issues and packet loss. Each segment may be configured with different TCP policies (e.g., windows scaling, Selective ACKs (SACK), Additive Increase/Multiplicative Decrease (AIMD), etc.) based on speed of link, congestion, peering points and customer preference. In addition, the TCP policies may be controlled per protocol, per client. Furthermore, the TCP policies may be changed at runtime based on traffic conditions at each segment.

In one embodiment, the segments may be formed through an Internet or private point-point leased lines, pre-provisioned, etc. The POP-POP multi-segmented architecture may be lossless. The lossless ability may be achieved using a combination of layer 4 and a proprietary buffer reservation system (e.g., storage at the POP location(s) 706A-N and optional CPE 710A-N). Furthermore, each segment may implement link utilization algorithms (e.g., interleaving algorithm, piggybacking algorithm, connection multiplexing algorithm) using transport protocols (layer 4) like standard TCP, High Speed TCP, Explicit Control Protocol (XCP) and/or even Stream Control Transmission Protocol (SCTP).

FIG. 8 also can be seen as the system view 850 illustrating application acceleration as a service, according to an example embodiment. In particular, FIG. 8 illustrates the head office 702, the branch office 704A-N, the POP 706A-N, an external service 806, and an external service 808, according to an example embodiment. The POP 706A-N may be installed to a "closest" location of the clients, the head office 702 and the branch office 704A-N. The POP location(s) 706A-N may be communicatively coupled to each other. In an embodiment, due to the presence of the multiple POP location(s) 706A-N, traffic may be intelligently diverted to the destination POP. The route between POP location(s) 706A-N may be determined before sending traffic (e.g., pre-provisioned) or determined after sending traffic (e.g., dynamic). The segment formed may have the application acceleration capabilities for communicating data without unwanted delay or packet loss. As a result, there may be significant improvement in bandwidth savings and lower latency.

For example, the branch office 704B may require communication with the external service(s) 806 (e.g., SAAS applications like Salesforce.com® and/or Web filtering like Websense®). Instead of sending the traffic to the POP 706A of the head office 702 for services, the POP 706C can direct the traffic to the POP 706B of the external service(s) 806 directly. As a result, the time for the data communication of data may significantly reduce. In another embodiment, when the head office 702, wants to communicate with external service(s) 806 (e.g. Amazon web services). The communication may be channeled directly to the external service(s) 806 by the POP 706A-N instead of directing through the Internet. Utilizing the POP location(s) 706A-N instead of directing through the Internet would substantially improve latency and reduce bandwidth costs.

In an embodiment, the system may provide high availability (e.g., connectivity end to end). In an event of the POP failure (e.g., due to a network congestion, a service unavailability, a segment policy, etc.), the system may switch the coupling to a different POP. In case, when there is an intermediate POP failure, an alternate route may be determined and the data is re-routed. Data re-routing may be well understood even in a label switched network. However, in a multi-segmented network with encryption and compression, the final destination may not be known unless the payload is inspected (and the payload is encrypted and compressed). The system may provide an out-of-band protocol that may communicate the final destination address used for controlling the re-routing of the compressed/encrypted payload in the event of POP failure. In an example embodiment, the head office 702 in FIG. 7 may require communication with the external service 806. If the communication between the POP 706A and the POP 706B fails, then the communication of the head office 702 may be routed via the POP 706C. In the event of communication failure between the POP 706A and the POP 706C, the communication may be established between the head office 702 by routing through the POP 706N to the POP 706C.

In another embodiment, the set of POP location(s) 706A-N may be shared by more than one licensed entity of the application acceleration service. For example, the external service provider(s) 806-808 may not be a part of the business entity. However, the service providers 806-808 may be clients of the business entity or the service providers to the business entity. The service providers 806-808 discussed herein may also be the licensed entities of the application acceleration service. Therefore, the service providers 806-808 may be entitled to use the POP location(s) 706A-N closest to them. As a result, the licensed entities may leverage both shared software and shared hardware infrastructure of an application acceleration service provider. It may be noted that the licensed entities may also have head offices and branch offices. The embodiments described herein may not be limited to hub-spoke configurations (e.g., the head office 702 serving as a hub and the branch office(s) 704A-N configured as a spokes). It should be noted that the embodiments described herein may also support hub-hub (e.g., the head office 702 requesting for services from an external service provider) and spoke-spoke configurations (e.g., services among the branch office(s) 704A-N).

Figure 9:
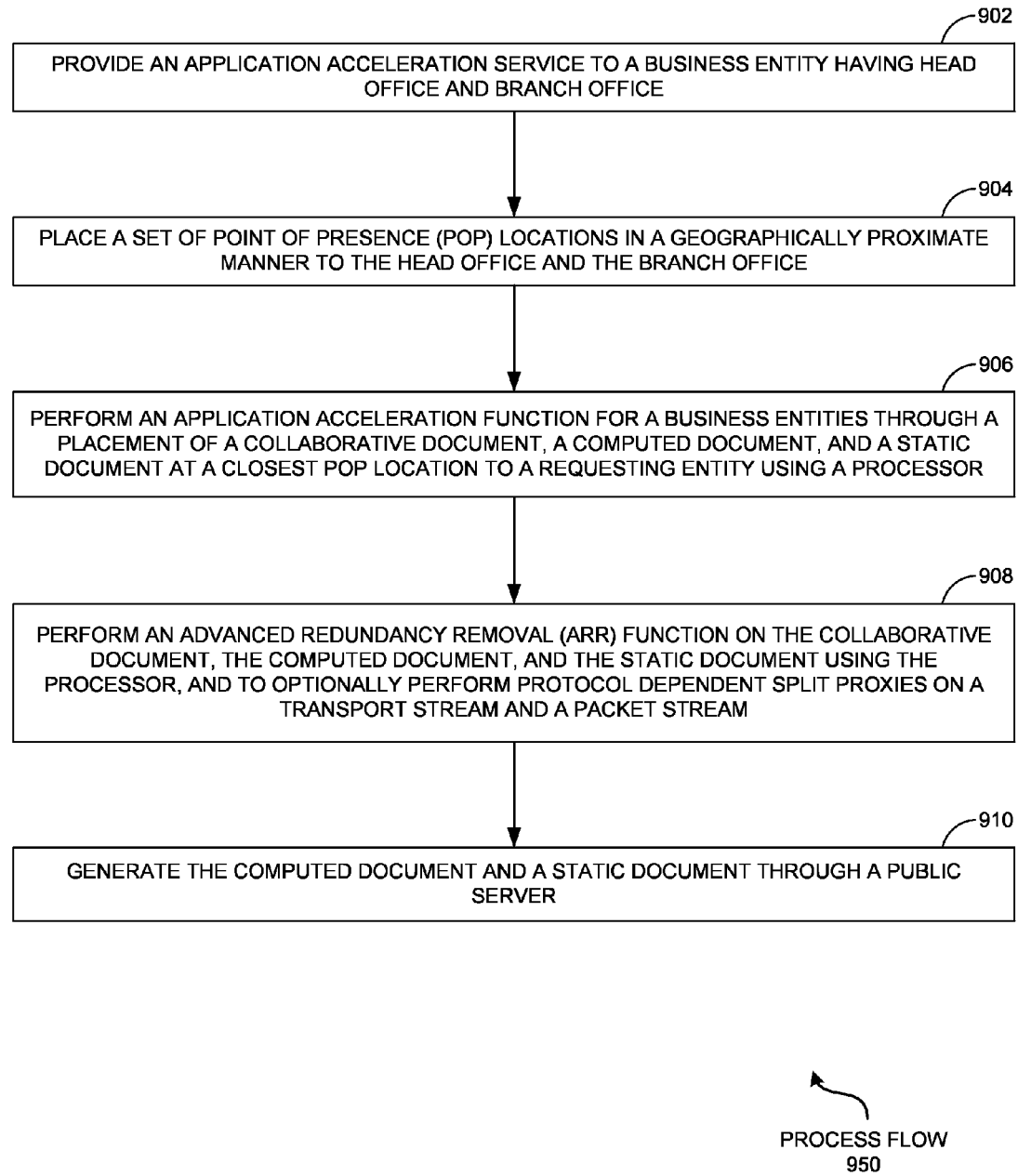
FIG. 9 is a process flow of providing the application acceleration as a service, according to one embodiment.

FIG. 9 is a process flow 950 of providing application acceleration as a service, according to one embodiment. In operation 902, an application acceleration service may be provided to a business entity having the head office 702 and branch office(s) 704A-N. In operation 904, the set of POP location(s) 706A-N may be placed in a geographically proximate manner to the head office 702 and the branch office 704A-N. In operation 906, an application acceleration function may be performed for the business entities through a placement of the collaborative document 718, the computed document 722 and the static document 727 at a closest POP location to the requesting entity using a processor. In operation 908, the ARR function may be performed on the collaborative document 718, the static document 727 and the computed document 722 using the processor. In operation 910, the computed document may be generated through the public server 726.

Figure 10:
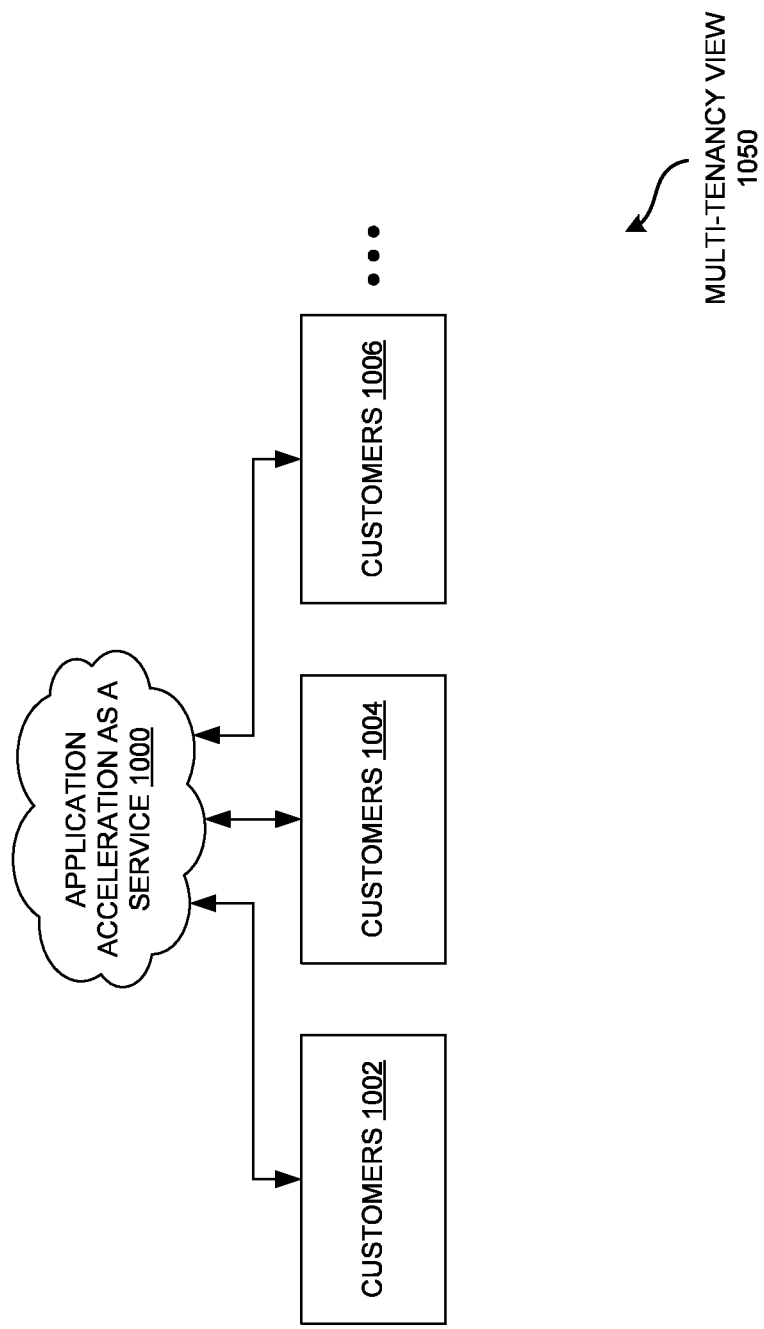
FIG. 10 is a multi-tenancy view illustrating a number of customers using the application acceleration as service, according to one or more embodiments.

FIG. 10 is a multi-tenancy view 1050 illustrating a number of customers using application acceleration as service 1000, according to one or more embodiments. In particular, FIG. 10 illustrates an application acceleration as a service 1000 and customers 1002-1006 availing the application acceleration as a service 1000, according to one or more embodiments. In one or more embodiments, the application acceleration as a service 1000 may be shared among the customers 1002-1006 also. In one or more embodiments, the customers 1002-1006 may avail the application acceleration as service through licensing. The customers 1002-1006 sharing the application acceleration as a service may enable faster communication within their entity as well as with the other customers who use the application acceleration as a service 1000. As a result, the customers 1002-1004 may leverage both shared software and shared hardware infrastructure of an application acceleration service provider.

Figure 11:
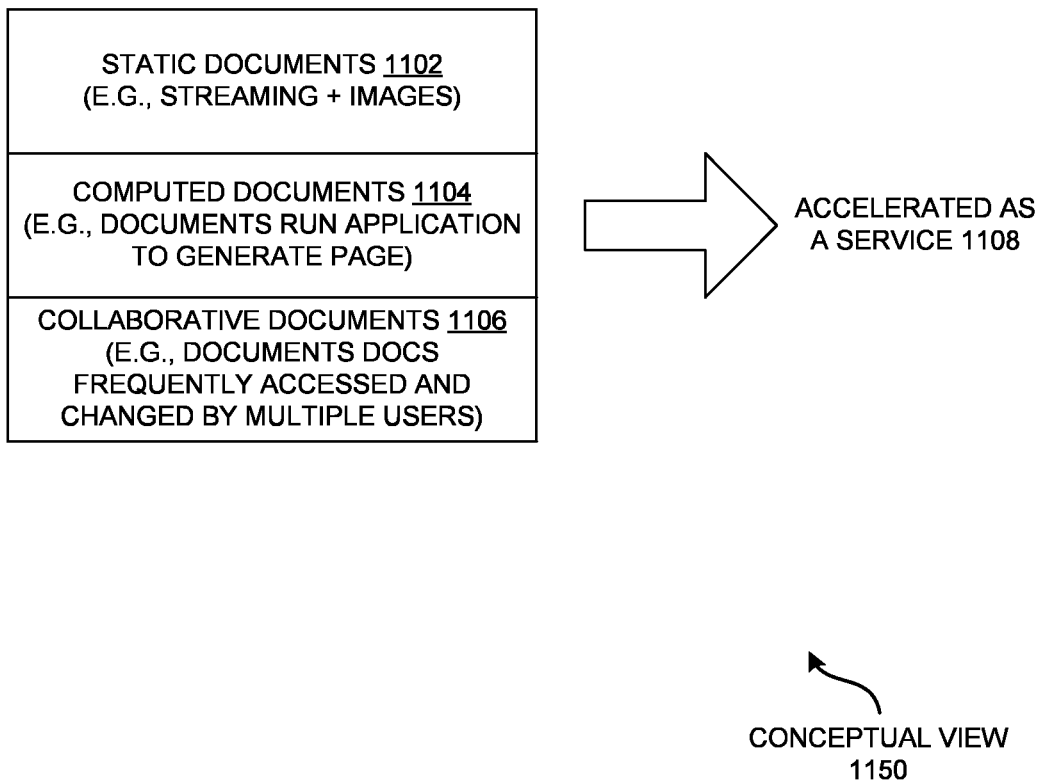
FIG. 11 is a conceptual view that illustrates a few types of documents that are accelerated using the application acceleration as a service, according to one or more embodiments.

FIG. 11 is a conceptual view 1150 that illustrates a few types of documents that are accelerated using the acceleration as a service, according to one or more embodiments. The enterprise application 720 of a serving entity (e.g., head office 702) as mentioned in above figures may generate the static documents 1102, computed documents 1104, collaborative documents 1106, etc. The aforementioned enterprise application 720 may also communicate the above said documents based on the request from the requesting entities. In one embodiment, the requesting entity may request for any of the static documents 1102 (e.g., streaming data, images, static content, etc.), the computed documents 1104 (e.g., HTML, XML, etc.), the collaborative documents (e.g., e.g., Microsoft® Word documents, Microsoft® Excel documents, documents that are frequently accessed and modified by number of users), etc. from the serving entity. The serving entity may communicate the requested document in a stream in a secure channel through the POPs that provide application acceleration as a service 1108.

An example embodiment will now be described. In a world that is increasingly interconnected and/or intelligent, we may need to satisfy growing demands for fast and uninterrupted access to dynamic applications. Fortunately, many tools and features of the various embodiments of FIGS. 1-11 may be available to help accelerate application as a service to ensure optimal delivery and/or offload backend server infrastructure. The application acceleration as a service may enable organizations to quickly and/or reliably deliver applications from cloud and/or centralized infrastructure to users around the world. By speeding up and/or optimizing the way servers interact with the Internet network, the solution (e.g., using the various embodiments of FIGS. 1-11) may accelerate application response time.

For an example embodiment, as many data center operators know, it may be difficult to control all aspects of the network between the application server and the end customer, which poses significant challenges for application performance. Thanks to the various features of FIGS. 1-11 that may be available to help in accelerating application as a service.

The various embodiments of FIGS. 1-11 may use a number of technologies to improve application performance and/or response time over network connections. The application acceleration (e.g., application acceleration 106 as described in FIG. 1-11) may overcome network effects such as WAN latency, packet loss, and/or bandwidth congestion using the various embodiments of FIGS. 1-11.

For example embodiment, application acceleration may improve the user experience to drive greater service adoption and improve the efficiency of underlying infrastructure to reduce capital and/or operational costs. By offloading compute-intensive functions from servers, enabling application-aware traffic management and/or optimizing the flow of traffic over wide area networks, application acceleration solutions may extract maximum performance in application infrastructure using the various embodiments of FIGS. 1-11.

For another example embodiment, the $95^{th}$ percentile calculation may provide a good measure of utilization for most traffic flows, particularly where there are bursts of traffic and/or where there are long periods of little traffic.

The various embodiments of FIGS. 1-11 may allow clients to slightly burst over their committed rate, giving the carrier an ability to scale their billing with the cost of the infrastructure and transit commits. The $95^{th}$ percentile may be an alternative to either fixed and/or actual data transferred payment methods, which are commonly seen outside the Data Center where erratic bursting is either forbidden and/or fined with greater bills. The various embodiments of FIGS. 1-11 may allow a client to experience a small burst in traffic with no overage charges. The method may state that in 95% of the time, the usage is around and/or below the specified amount. On the other hand, 5% of the time, the usage may be bursting beyond the rate.

With the $95^{th}$ percentile, businesses may pay for what they utilize instead of having a bandwidth cap employed. There may be no need for carriers to set caps and/or apply various policies to maintain the traffic below the customer's commit rate. Therefore, the various embodiments of FIGS. 1-11 may reduce the provider's infrastructure and management spending.

Another example embodiment will now be described. Business and/or IT leaders may know the importance of consistently reaching customers, regardless of the location of the customer who uses application acceleration as a service that may combine Internet application delivery technologies with enterprise infrastructure appliances. This combination may support rapid, security-enhanced delivery of applications to employees, partners and/or customers around the globe. The various embodiments of FIGS. 1-11 may simplify the environment, reduce response time and/or increase business agility. The billing and/or measurement methodology may be shorthand describing a process of determining the $95^{th}$ percentile of usage and/or the uncompressed equivalent as measured by the various embodiments of FIGS. 1-11.

By offloading network and servers, the various embodiments of FIGS. 1-11 may decrease the need for additional bandwidth and/or hardware. Users may get fast access to applications, gain greater revenue and/or free up IT resources for other strategic projects.

The various embodiments of FIGS. 1-11 may overcome network, protocol, and/or application issues to help in meeting application performance, fault tolerance and/or replication.

An example embodiment will now be described, in accordance with at least one embodiment. The RPM Solutions Inc., a California based medical billing service provider may have branches all over the world. Using the various embodiments of FIGS. 1-11, the RPM Solutions Inc. may not need to purchase, deploy, and/or maintain expensive infrastructure (e.g., compression appliances, decompression equipment, etc.) at the head office (in San Francisco) and/or at each branch office (in London and/or Geneva) to accelerate private applications and/or secure data. The RPM Solutions Inc. may not need to purchase expensive and proprietary hardware and/or software solutions that perform functions such as load balancing, compression, de-compression, and/or packet routing. In addition, the RPM Solutions Inc. may not need to purchase expensive Multiprotocol Label Switching (MPLS) services from bandwidth providers.

A California based medical billing service provider, RPM Solutions Inc. which uses application acceleration as a service may encounter great challenges in billing customers having multiple geographically distributed entities. The number of these entities may be in the tens of thousands. Thanks to the various embodiments of FIGS. 1-11 that may overcome complexities of billing that involved billing customers of RPM Solutions Inc. across different aspects of the acceleration service (e.g., time zone, geography, bandwidth usage) and across different criteria (e.g., volume, traffic). Massive computing power may not be required to determine billing in such instances, and significant resources need not be expended in facilitating the billing process of application acceleration as a service in RPM Solutions Inc. Therefore, efficiency may be increased and may simplify the billing processes of the RPM Solutions Inc. of application acceleration services using the various embodiments of FIGS. 1-11.

Various embodiments of the methods and system described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, an input device, and/or an output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kind of devices can be used to provide for interaction with a user as well. For example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and/or a wide area network ("WAN") (e.g., the Internet). The computing system can include a client and/or a server. In one embodiment, the client and/or the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, device and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:
sampling a usage data of a network entity of an application acceleration as a service provider in intervals of five minutes using a processor and a memory, wherein each five minute interval constitutes a billing unit;
a storage system configured to sort each billing unit of a customer based on bandwidth usage to determine a top five percent (5%) of samples in a period of a billing cycle;
a process algorithm configured to designate the top 5% of samples in the period of the billing cycle as a burst bandwidth data;
a processing unit configured to automatically calculate a 95th percentile value based on a next value in the billing cycle after the top 5% of samples in the billing cycle;
a computation unit configured to incrementally compute the 95th percentile of each of a plurality of billable units for each of billing measurements for a large scale data associated with the network entity by computing the 95th percentile upon a newest set of data arrived to the network entity in each five minute interval; and
a processing unit configured to determine a billing amount based on an incremental computation of the 95th percentile of each of the plurality of billable units for each of billing measurements for the large scale data associated with the network entity by a computation applied only upon the newest set of data arrived to the network entity in each five minute interval,
wherein the computation does not require traversing through all the data for the billing cycle associated with each of the plurality of billable units.

2. The method of claim 1:
wherein the incremental computation includes processing only the newest set of data arrived at every run of the method, and
wherein the newest set of data is a data that arrived from an Internet network between a current run and a previous run of a process.

3. The method of claim 2 further comprising: executing a sequence of processes to run a compute of all billing details across each of the plurality of billable units;
persisting the sequence of processes into the storage system; and
serving any request to view 95th percentile data from the storage system in real time whenever it is requested by the customer on an ad hoc basis; and
generating a billing statement in real time whenever it is requested by the customer on the ad hoc basis through an incremental computation method.

4. The method of claim 3 further comprising:
collecting a statistical data for all the network entities served; and
reconciling a calculated amount across each of the plurality of billable units with an agreement with the customer at a commencement of an engagement with the service provider.

5. The method of claim 4 further comprising: applying the process algorithm to communicate the data into a distributed file system; and utilizing a Hadoop framework to provide fault tolerance to the data and to provide parallel computation of a billing network across all entities.

6. The method of claim 5 further comprising: defining a sequence of operations from all service models offered through the application acceleration as the service provider, wherein at least one sequence includes a Directed Acyclic Graph of map reduce applications; and chaining a map reduce functions into a SQL-like declarative data flow language, wherein the SQL-like declarative data flow language is Apache Pig.

7. The method of claim 6 further comprising:
utilizing a persistence model comprising of bounded min max priority queue to attain the fault tolerance and replication;
indexing a queue for each and every entity;
resetting the queue for each network entity; and
evoking a second level process to define a sequence of a map-reduce job that further processes the data.

8. The method of claim 7:
wherein the incremental computation to provide a very efficient and scalable method to automate a billing computation associated with the customer, and
wherein the storage system to store results of incremental computations a-priori at short and defined intervals.

9. The method of claim 1,
wherein on every interval execution, a second level process:
to analyze an input samples stored in a distributed file system,
to aggregate a one minute data written by network nodes to 5 min data per each network entity,
to search an indexed persistence model to fetch a min max priority queue for that entity and ingest bandwidth information from a network file data into a min max queue while preserving a structure of the min max priority queue,
to initialize a bounded min max priority queue for each of the entities to zero at a first cycle of a billing period,
to bound the min max priority queue with size equivalent to a 5% of a set of possible samples in the billing period plus one,
to add a new set of values to the bounded min max priority queue,
to reject any new value from the bounded min max priority queue if the new value is lesser than a smallest value in the bounded min max priority queue while the bounded min max priority queue is full,
to evict the smallest value from the bounded min max priority queue if the new value is larger than the smallest value in the bounded min max priority queue while the bounded min max priority queue is full,
to extract a min value of the bounded min max priority queue as the $95^{th}$ percentile value of the billing period, and
to extract a max value of the bounded min max priority queue as a peak value of the billing period.

10. The method of claim 1:
wherein the usage data is sampled across each geographic location and each network entity associated with the customer of the application acceleration as the service provider.

11. The method of claim 10:
wherein the usage data is at least one of a calculation of bytes of data transferred from the network entity, bytes of data received by the network entity, a bits-per-second traffic rate sent from the network entity to a wide area network (WAN), and a bits per second traffic rate received to the network entity from a WAN.

12. The method of claim 11: wherein the network entity is at least one of a point of presence (POP) node in the WAN, an aggregate network utilization estimation of the customer taken as a whole, and a logical network module deployed for the customer across in furtherance of the application acceleration as the service provider.

13. A method comprising: sampling a usage data of a network entity of an application acceleration as a service provider in intervals of five minutes, wherein each five minute interval constitutes a billing unit;
a storage system configured to sort each billing unit of a customer based on bandwidth usage to determine a top nth percent of samples in a period of a billing cycle;
a process algorithm configured to designate a top nth of samples in the period of the billing cycle as a burst bandwidth data;
a processing unit configured to automatically calculate a 1-nth percentile value based on a next value in the billing cycle after the top nth percentile of samples in the billing cycle using a processor and a memory;
a computation unit configured to incrementally compute the 1-nth percentile of each of a plurality of billable units for each of billing measurements for a large scale data associated with the network entity by computing the 1-nth percentile upon a newest set of data arrived to the network entity in each five minute interval using the processor and the memory; and
a processing unit configured to determine a billing amount based on an incremental computation of the 1-nth percentile of each of the plurality of billable units for each of billing measurements for the large scale data associated with the network entity by a computation applied only upon the newest set of data arrived to the network entity in each five minute interval,
wherein the computation does not require traversing through all the data for the billing cycle associated with each of the plurality of billable units,
wherein the incremental computation includes processing only the newest set of data arrived at every run of the method, and
wherein the newest set of data is a data that arrived from an Internet network between a current run and a previous run of a process.

14. The method of claim 13 further comprising:
executing a sequence of processes to run a compute of all billing details across each of the plurality of billable units;
persisting the sequence of processes into the storage system; and
serving any request to view 1-nth percentile data from the storage system in real time whenever it is requested by the customer on an ad hoc basis; and
generating a billing statement in real time whenever it is requested by the customer on the ad hoc basis through an incremental computation method.

15. The method of claim 14 further comprising:
collecting a statistical data for all the network entities served; and
reconciling a calculated amount across each of the plurality of billable units with an agreement with the customer at a commencement of an engagement with the service provider.

16. The method of claim 15 further comprising: applying the process algorithm to communicate the data into a distributed file system; and utilizing a Hadoop framework to provide fault tolerance to the data and to provide parallel computation of a billing network across all entities.

17. A method comprising: sampling a usage data of a network entity of an application acceleration as a service provider in intervals of five minutes using a processor and a memory, wherein each five minute interval constitutes a billing unit;
- a storage system configured to sort each billing unit of a customer based on bandwidth usage to determine a top nth of samples in a period of a billing cycle;
- a process algorithm configured to designate the top nth of samples in the period of the billing cycle as a burst bandwidth data;
- a processing unit configured to automatically calculate a 1-nth percentile value based on a next value in the billing cycle after the top nth of samples in the billing cycle;
- a computation unit configured to incrementally compute the 1-nth percentile of each of a plurality of billable units for each of billing measurements for a large scale data associated with the network entity by computing the 1-nth percentile upon a newest set of data arrived to the network entity in each five minute interval;
- a processing unit configured to determine a billing amount based on an incremental computation of the 1-nth percentile of each of the plurality of billable units for each of billing measurements for the large scale data associated with the network entity by a computation applied only upon the newest set of data arrived to the network entity in each five minute interval, wherein the computation does not require traversing through the usage data for the billing cycle associated with each of the plurality of billable units;
applying the process algorithm to communicate the usage data into a distributed file system; and
utilizing a Hadoop framework to provide fault tolerance to the usage data and to provide parallel computation of a billing network across all entities.

18. The method of claim 17:
wherein the incremental computation includes processing only the newest set of data arrived at every run of the method, and
wherein the newest set of data is data that arrived from an Internet network between a current run and a previous run of a process.

19. The method of claim 18 further comprising: executing a sequence of processes to run a compute of all billing details across each of the plurality of billable units;
persisting the sequence of processes into the storage system; and
serving any request to view 1-nth percentile data from the storage system in real time whenever it is requested by the customer on an ad hoc basis; and
generating a billing statement in real time whenever it is requested by the customer on the ad hoc basis through an incremental computation method.

20. The method of claim 19 further comprising:
collecting a statistical data for all the network entities served; and
reconciling a calculated amount across each of the plurality of billable units with an agreement with the customer at a commencement of an engagement with the service provider.

* * * * *